(12) United States Patent  
Tajima et al.

(10) Patent No.: US 9,071,384 B2  
(45) Date of Patent: Jun. 30, 2015

(54) NETWORK DESIGN APPARATUS, NETWORK DESIGN METHOD, AND STORAGE MEDIUM STORING NETWORK DESIGN PROGRAM

(71) Applicant: FUJITSU LIMITED, Kawasaki-shi, Kanagawa (JP)

(72) Inventors: Kazuyuki Tajima, Yokosuka (JP); Yutaka Takita, Kawasaki (JP); Tomohiro Hashiguchi, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 87 days.

(21) Appl. No.: 14/028,801

(22) Filed: Sep. 17, 2013

(65) Prior Publication Data

US 2014/0099112 A1    Apr. 10, 2014

(30) Foreign Application Priority Data

Oct. 9, 2012  (JP) .................................. 2012-224191

(51) Int. Cl.
*H04J 14/08* (2006.01)
*H04J 14/00* (2006.01)
*H04L 12/28* (2006.01)
*H04L 12/24* (2006.01)
*H04L 12/721* (2013.01)
*H04L 12/751* (2013.01)

(52) U.S. Cl.
CPC ............ *H04J 14/083* (2013.01); *H04L 41/145* (2013.01); *H04L 45/02* (2013.01); *H04L 45/12* (2013.01)

(58) Field of Classification Search
CPC ........ H04L 41/045; H04L 45/02; H04L 45/12

USPC ........................................................ 398/66.43
See application file for complete search history.

(56) References Cited

U.S. PATENT DOCUMENTS

| | | | | |
|---|---|---|---|---|
| 6,144,727 A * | 11/2000 | Mashinsky | ............... | 379/114.02 |
| 6,542,468 B1 * | 4/2003 | Hatakeyama | .................. | 370/238 |
| 6,633,544 B1 * | 10/2003 | Rexford et al. | ............... | 370/238 |
| 6,687,229 B1 * | 2/2004 | Kataria et al. | ................ | 370/238 |

(Continued)

FOREIGN PATENT DOCUMENTS

JP    2008-301225    12/2008

OTHER PUBLICATIONS

Sakawa, Masatoshi, "Optimization of Discrete Systems", Morikita Publishing, pp. 33-59, pp. 61-83, May 2000.

*Primary Examiner* — Oommen Jacob
(74) *Attorney, Agent, or Firm* — Staas & Halsey LLP

(57) ABSTRACT

A network design apparatus includes a storage unit configured to store network topology information indicating a connection relationship between a plurality of nodes in a network in which the plurality of nodes are connected to each other by a link and demand information indicating a demand including a starting point node, an ending point node, a route, and the number of the demands, and a control unit configured, based on the network topology information and the demand information, to take out a certain number of nodes from the sorted nodes having the higher rank and generate combination candidates of transmission paths in which the starting point node, the ending point node, and the certain number of nodes are set as terminal points with regard to the respective demands, and determine a combination of the transmission paths that accommodate the demand from the combination candidates of the transmission paths.

10 Claims, 45 Drawing Sheets

(56) References Cited

U.S. PATENT DOCUMENTS

| | | | |
|---|---|---|---|
| 7,466,913 B2* | 12/2008 | Saniee et al. | 398/3 |
| 7,765,321 B2* | 7/2010 | Twata et al. | 709/238 |
| 8,098,648 B2* | 1/2012 | Nakata et al. | 370/351 |
| 2003/0099014 A1* | 5/2003 | Egner et al. | 359/124 |
| 2005/0069314 A1* | 3/2005 | De Patre et al. | 398/5 |
| 2005/0237950 A1* | 10/2005 | Yuan et al. | 370/255 |
| 2007/0076601 A1* | 4/2007 | Wang et al. | 370/229 |
| 2009/0087180 A1* | 4/2009 | Allen | 398/45 |
| 2009/0161536 A1* | 6/2009 | Grover et al. | 370/221 |
| 2014/0099112 A1* | 4/2014 | Tajima et al. | 398/66 |

\* cited by examiner

FIG. 8

| NODE NAME |
|---|
| N1 |
| N2 |
| N3 |
| N4 |
| N5 |
| N6 |
| N7 |
| N8 |

FIG. 9

| STARTING POINT NODE | ENDING POINT NODE |
|---|---|
| N1 | N2 |
| N2 | N3 |
| N3 | N4 |
| N4 | N5 |
| N5 | N6 |
| N3 | N7 |
| N5 | N8 |

FIG. 11

| STARTING POINT NODE | ENDING POINT NODE | BAND | NUMBER OF DEMANDS | ROUTE |
|---|---|---|---|---|
| N1 | N3 | 2 | 1 | N1, N2, N3 |
| N1 | N6 | 2 | 1 | N1, N2, N3, N4, N5, N6 |
| N1 | N7 | 1 | 2 | N1, N2, N3, N7 |
| N3 | N4 | 1 | 2 | N3, N4 |
| N4 | N7 | 2 | 1 | N4, N3, N7 |
| N4 | N8 | 2 | 1 | N4, N5, N8 |
| N5 | N8 | 1 | 2 | N5, N8 |
| N6 | N8 | 2 | 1 | N6, N5, N8 |

FIG. 14

| NODE NAME | NUMBER OF TERMINATING DEMANDS | NUMBER OF PASSING DEMANDS | SCORE |
|---|---|---|---|
| N1 | 4 | 0 | 4 |
| N2 | 0 | 4 | 4 |
| N3 | 3 | 4 | 7 |
| N4 | 4 | 1 | 5 |
| N5 | 2 | 3 | 5 |
| N6 | 2 | 0 | 2 |
| N7 | 3 | 0 | 3 |
| N8 | 4 | 0 | 4 |

FIG. 15

| NODE NAME | DEGREE |
|---|---|
| N1 | 1 |
| N2 | 2 |
| N3 | 3 |
| N4 | 2 |
| N5 | 3 |
| N6 | 1 |
| N7 | 1 |
| N8 | 1 |

FIG. 16

| RANK | NODE NAME |
|---|---|
| 1 | N3 |
| 2 | N5 |
| 3 | N4 |
| 4 | N1 |
| 5 | N8 |
| 6 | N7 |
| 7 | N6 |
| 8 | N2 |

FIG. 17

| NODE NAME | RANK |
|---|---|
| N1 | 4 |
| N2 | 8 |
| N3 | 1 |
| N4 | 3 |
| N5 | 2 |
| N6 | 7 |
| N7 | 6 |
| N8 | 5 |

FIG. 18

| NODE NAME |
|---|
| N2 |
| N3 |
| N4 |
| N5 |

FIG. 19

| RANK | NODE NAME |
|---|---|
| 1 | N3 |
| 2 | N5 |
| 3 | N4 |
| 4 | N2 |

FIG. 20

| STARTING POINT NODE | ENDING POINT NODE | k VALUE |
|---|---|---|
| N1 | N3 | 0 |
| N1 | N6 | 0, 1, 2, 3 |
| N1 | N7 | 0, 1 |
| N3 | N4 | 0 |
| N4 | N7 | 0, 1 |
| N4 | N8 | 0, 1 |
| N5 | N8 | 0 |
| N6 | N8 | 0, 1 |

FIG. 22

| STARTING POINT NODE | ENDING POINT NODE | COMBINATION CANDIDATES OF TDM TRANSMISSION PATHS |
|---|---|---|
| N1 | N3 | {N1-N3} |
| N1 | N6 | {N1-N6}<br>{N1-N3, N3-N6}<br>{N1-N3, N3-N5, N5-N6}<br>{N1-N3, N3-N4, N4-N5, N5-N6} |
| N1 | N7 | {N1-N7}<br>{N1-N3, N3-N7} |
| N3 | N4 | {N3-N4} |
| N4 | N7 | {N4-N7}<br>{N4-N3, N3-N7} |
| N4 | N8 | {N4-N8}<br>{N4-N5, N5-N8} |
| N5 | N8 | {N5-N8} |
| N6 | N8 | {N6-N8}<br>{N6-N5, N5-N8} |

FIG. 26

| NODE NAME | FLAG |
|---|---|
| N1 | true |
| N2 | false |
| N3 | true |
| N4 | true |
| N5 | true |
| N6 | true |
| N7 | true |
| N8 | true |

NETWORK DESIGN APPARATUS, NETWORK DESIGN METHOD, AND STORAGE MEDIUM STORING NETWORK DESIGN PROGRAM

CROSS-REFERENCE TO RELATED APPLICATION

This application is based upon and claims the benefit of priority of the prior Japanese Patent Application No. 2012-224191, filed on Oct. 9, 2012, the entire contents of which are incorporated herein by reference.

FIELD

The embodiments discussed herein are related to a network design apparatus, a network design method, and a storage medium storing a network design program.

BACKGROUND

A time division multiplexing (TDM) technology of accommodating signals of a large number of subscriber lines between telephone stations (buildings) is proposed. A transmission path that accommodates the signals of the subscriber lines on the basis of the TDM technology is referred to as a TDM transmission path. The signal of the subscriber line accommodated in the TDM transmission path is referred to as a traffic demand or demand. The demand specifies a route for a signal transmission from a starting point node to an ending point node. For example, a synchronous digital hierarchy (SDH) transmission path, an optical transport network (OTN) transmission path which has been standardized in recent years, or the like may be exemplified as the TDM transmission path.

When a demand is transmitted by using an optical fiber laid between telephone stations serving as nodes, signals of plural subscriber lines that may be transmitted through the same optical fiber are multiplexed in the TDM transmission path and transmitted. Optical fibers have been laid between adjacent telephone stations (nodes), and the TDM transmission path is set between a telephone station (node) on one end of an optical fiber and a telephone station (node) on the other end thereof. At this time, a mode in which one TDM transmission path passes through one optical fiber is typically adopted.

FIG. 1 illustrates an example including nodes, optical fibers, and TDM transmission paths. In the example of FIG. 1, a node A, a node B, a node C, a node D, and a node E are provided. Optical fibers are laid between the nodes A and B, between the nodes B and C, between the nodes C and D, and between the nodes D and E. The TDM transmission paths are set in four sections between the nodes A and B (#1), between the nodes B and C (#2), between the nodes C and D (#3), and between the nodes D and E (#4). At this time, for example, in a demand between the nodes A and E, the demand between the nodes A and B is accommodated in the TDM transmission path between the nodes A and B, the demand between the nodes B and C is accommodated in the TDM transmission path between the nodes B and C, the demand between the nodes C and D is accommodated in the TDM transmission path between the nodes C and D, and the demand between the nodes D and E is accommodated in the TDM transmission path between the nodes D and E. In this example, the demand between the nodes A and E is accommodated by an accommodating method offering this single set.

In recent years, a wavelength division multiplexing (WDM) technology has been introduced, and a device called an optical add/drop multiplexer (OADM) has been installed at the node. The OADM is an optical add/drop apparatus configured to perform add/drop or route switching of an optical signal in units of wavelength while keeping the optical signal. According to the WDM technology, as in related art, not only the TDM transmission path is set between adjacent nodes, but also the TDM transmission path may also be set between nodes that are not adjacent to each other since the optical signal passes through another node midway between the nodes while remaining as light.

FIG. 2 illustrates a configuration example of the OADM. When a wavelength-multiplexed optical signal is input from one optical fiber, the OADM illustrated in FIG. 2 demultiplexes the optical signal for each wavelength to be divided into light passing as it is, light to be dropped, and light to be added by an optical switch (optical SW). Furthermore, the OADM multiplexes optical signals for each wavelength to be output to the other optical fiber. The wavelength-multiplexed optical signal may also be input to the OADM from the other optical fiber.

FIG. 3 illustrates an example of the TDM transmission path. In the example of FIG. 3, the node A, the node B, the node C, the node D, and the node E are provided, and optical fibers (links) are laid between the nodes A and B, between the nodes B and C, between the nodes C and D, and between the nodes D and E similarly as in the example of FIG. 1. Herein, suppose that the OADM illustrated in FIG. 2 is arranged at the node B, the node C, and the node D in FIG. 1 (FIG. 3). In this case, in addition to the four sections of #1 to #4 illustrated in FIG. 1, the TDM transmission path may also be set in six sections between the nodes A and C (#5), between the nodes C and E (#6), between the nodes B and D (#7), between the nodes A and D (#8), between the nodes B and E (#9), and between the nodes A and E (#10) as illustrated in FIG. 3. According to this, the method of accommodating the demand between the nodes A and E differs from the above-mentioned accommodating method offering the single set.

FIG. 4 illustrates an example of a demand accommodating method. When the OADM illustrated in FIG. 2 is installed at the node B, the node C, and the node D in FIG. 1, the method of accommodating the demand between the nodes A and E has eight different sets as illustrated in FIG. 4. Specifically, the sets include a route using the TDM transmission paths of #1, #2, #3, and #4 (the same as the example in FIG. 1), a route using the TDM transmission paths of #5, #3, and #4, a route using the TDM transmission paths of #1, #2, and #6, and a route using the TDM transmission paths of #5 and #6. The sets further include a route using the TDM transmission paths of #1, #7, and #4, a route using the TDM transmission paths of #8 and #4, a route using the TDM transmission paths of #1 and #9, and a route using the TDM transmission path of #10. In this manner, with the introduction of the WDM technology, plural combinations of the TDM transmission paths used for accommodating one demand exist. An appropriate combination of the TDM transmission paths is desired to be selected while taking into account the accommodation of the other demands or the like with regard to respective demands.

For example, in a case where the OADM is installed at all the nodes on a certain network, it is assumed that the number of demands is K, and the number of nodes that a demand j (j=1, ..., K) passes from a starting point to an ending point is $n_j$ inclusive of the starting point and the ending point. At this time, the number of combinations of the TDM transmission paths that accommodate the demand j is represented as follows.

$$2^{n_j - 2}$$

Since the respective demands may select the combination of the TDM transmission paths to be accommodated independently of the other demands, the number of possible combinations for all the demands is represented as follows.

$$2^{n1-2} \times 2^{n2-2} \times \ldots \times 2^{nK-2}$$

Demands that select the TDM transmission path in the same section among the combinations of the TDM transmission paths selected for the respective demands may be multiplexed in the same TDM transmission path within a range of a capacity of the TDM transmission path. Therefore, the combination with which the number of TDM transmission paths for accommodating all the demands is minimized exists. As a method of obtaining this combination, mixed integer programming is proposed.

It is assumed that a capacity menu of the TDM transmission path is set as m. For example, m=1 represents a capacity of 8, and m=2 represents a capacity of 32. The capacity is equivalent, for example, to a circuit speed or a bit rate. It is also assumed that a number of TDM transmission path is set as h, and $x_m(h)$ denotes the number of TDM transmission paths h of the capacity menu m. $cost_m$ denotes a cost of the TDM transmission path of the capacity menu m. An objective function for obtaining a minimal solution of the cost of the TDM transmission path by using this notation is represented as follows.

$$\text{minimize} \sum_m \left\{ \sum_h cost_m x_m(h) \right\}$$

(for $\forall m, \forall h$)

Next, constraints with regard to the demand will be described.

$$\sum_t T(l, t) \cdot d(t) = numberOfDemands(l)$$

(for $\forall l$)

Herein, T(l, t) is 1 when the combination candidate t of the TDM transmission paths may accommodate a demand l, and T(l, t) is 0 when the combination candidate t of the TDM transmission paths does not accommodate the demand l. The combination candidate of the TDM transmission paths is assigned with a number for demands having the same starting and ending points. For example, the combination candidate using the TDM transmission paths #1, #2, #3, and #4 in FIG. 4 is assigned such that l is 1. d(t) denotes the number of demands to be accommodated by the combination candidate t of the TDM transmission paths. numberOfDemands(l) denotes the number of the demands l. Therefore, the above-mentioned constraint means restrictions where the respective demands are to be accommodated by any one of the combinations of the TDM transmission paths.

Next, the capacity constraint for each TDM transmission path will be described.

$$\sum_t Demand\_Cap(t) \cdot I(h, t) \cdot d(t) - \sum_m TDM\_CAP(m) \cdot x_m(h) \leq 0$$

(for $\forall h$)

Demand_Cap(t) denotes a demand band with regard to a demand accommodation pattern t. The demand band is, for example, a bit rate per demand. I(h, t) is 1 in a case where the TDM transmission path h is included in the combination candidate t of the TDM transmission paths, and I(h, t) is 0 in a case where the TDM transmission path h is not included in the combination candidate t. For this reason, a first term of the expression represents a value obtained by multiplying the demand band by the number of demands to be accommodated in the demand accommodation pattern t with regard to the demand accommodation pattern t where the TDM transmission path h is included, that is, represents a total band of the demands accommodated in the TDM transmission path h. TDM_CAP(m) represents a capacity of the TDM transmission path of the capacity menu m. In the above-mentioned case, TDM_CAP(1) is 8 and TDM_CAP(2) is 32. A second term of the expression represents a total capacity of the TDM transmission path h of the capacity menu m. That is, the above-mentioned expression represents the condition that the total band of the demands accommodated in the TDM transmission path does not exceed the total capacity of the TDM transmission path.

Next, constraint on a wavelength number restriction of a link will be described. The link corresponds to an optical fiber between adjacent nodes.

$$\sum_h \left[ Link(s, h) \cdot \left\{ \sum_m x_m(h) \right\} \right] \leq Wavelength(s)$$

(for $\forall s$)

Herein, Link(s, h) is 1 when the TDM transmission path h passes a link s, and Link(s, h) is 0 when the TDM transmission path h does not pass the link s. A left side of the expression represents the total number of TDM transmission paths that pass the link s. Wavelength(s) represents a wavelength number that may be utilized in the link s.

The number $x_m(h)$ of the respective TDM transmission paths may be obtained on the basis of the solution using the above-mentioned objective function and the three constraint expressions by the mixed integer programming. A solution method of the mixed integer programming has been proposed (for example, see Sakawa, Masatoshi, *Optimization of Discrete Systems*, Morikita Publishing, pp. 33-59, pp. 61-83, May, 2000). It is possible to carry out an appropriate network design by obtaining the minimum solution (optimal solution) in terms of the cost of the TDM transmission paths.

If the number of combination candidates of the TDM transmission paths that accommodate the demand is high, a range of a value that the demand accommodation pattern t may take is very wide, so that the expression of the mixed integer programming problem may be very large in some cases. If the expression becomes large, the calculation period of time is prolonged, and a vast storage area is also used, so that a case occurs that a general calculation facility such as a personal computer (PC) does not solve the problem. In addition, in a case where a search for all the possible combinations of the TDM transmission paths is conducted without using mathematical programming such as the mixed integer programming, it is difficult to solve the problem in a realistic period of time since the number of combination candidates of the TDM transmission paths is high. Therefore, to solve the problem in a realistic period of time, it is desirable to narrow down the combination candidates of the TDM transmission paths to those having a high probability of being the optimal solution.

For example, see Japanese Laid-open Patent Publication No. 2008-301225.

SUMMARY

According to an aspect of the embodiments, a network design apparatus includes a storage unit configured to store network topology information indicating a connection relationship between a plurality of nodes in a network in which the plurality of nodes are connected to each other by a link and demand information indicating a demand including a starting point node, an ending point node, a route, and the number of the demands; and a control unit configured, based on the network topology information and the demand information, to calculate a total value of the number of the demands terminating at the respective nodes and the number of the demands passing through the respective nodes, calculate a degree of the node indicating the number of other nodes connected by the link, create an order list in which the plurality of nodes are arranged in a manner that the node having a higher degree of the node is placed at a higher rank, the node having a higher total value is placed at the higher rank in a case where the nodes have a same degree of the node, and the node having no terminating demand is placed at a lower rank, sort the nodes passing through between the starting point node and the ending point node except for the starting point node and the ending point node in accordance with the order list in the respective demands, take out a certain number of nodes from the sorted nodes having the higher rank and generate combination candidates of transmission paths in which the starting point node, the ending point node, and the certain number of nodes are set as terminal points with regard to the respective demands, and determine a combination of the transmission paths that accommodate the demand from the combination candidates of the transmission paths.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates an example of node information;

FIG. 9 illustrates an example of link information;

FIG. 11 illustrates an example of demand information;

FIG. 14 illustrates an example of the number of terminating demands, the number of passing demands, and a score for each node;

FIG. 15 illustrates an example of a degree of the node in the network topology of FIG. 7;

FIG. 16 illustrates an example (1) of an order list of nodes generated by a node order list generation unit;

FIG. 17 illustrates an example (2) of the order list of the nodes generated by the node order list generation unit;

FIG. 18 illustrates an example of a mid-flow node list;

FIG. 19 illustrates an example of a sorted mid-flow node list;

FIG. 20 illustrates an example of a k value list;

FIG. 22 illustrates an example of TDM transmission path combination candidates to be generated;

FIG. 26 illustrates an example of a non-selectable flag for the node;

DESCRIPTION OF EMBODIMENTS

Hereinafter, an embodiment will be described with reference to the drawings. A configuration of the embodiment is an example, and the disclosed configuration is not limited to a specific configuration of the disclosed embodiment. A specific configuration in accordance with the embodiment may also appropriately be adopted when the disclosed configuration is carried out.

Embodiment

Configuration Example

Figure 1:
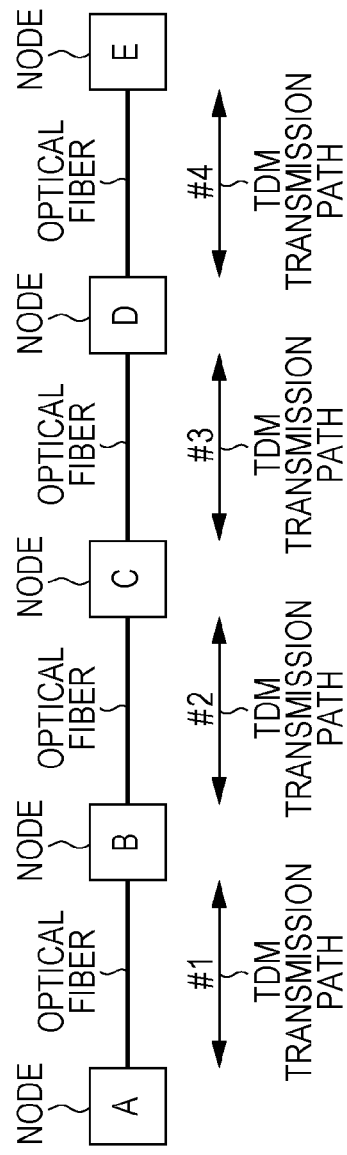
FIG. 1 illustrates examples of nodes, optical fibers, and TDM transmission paths.
Figure 2:
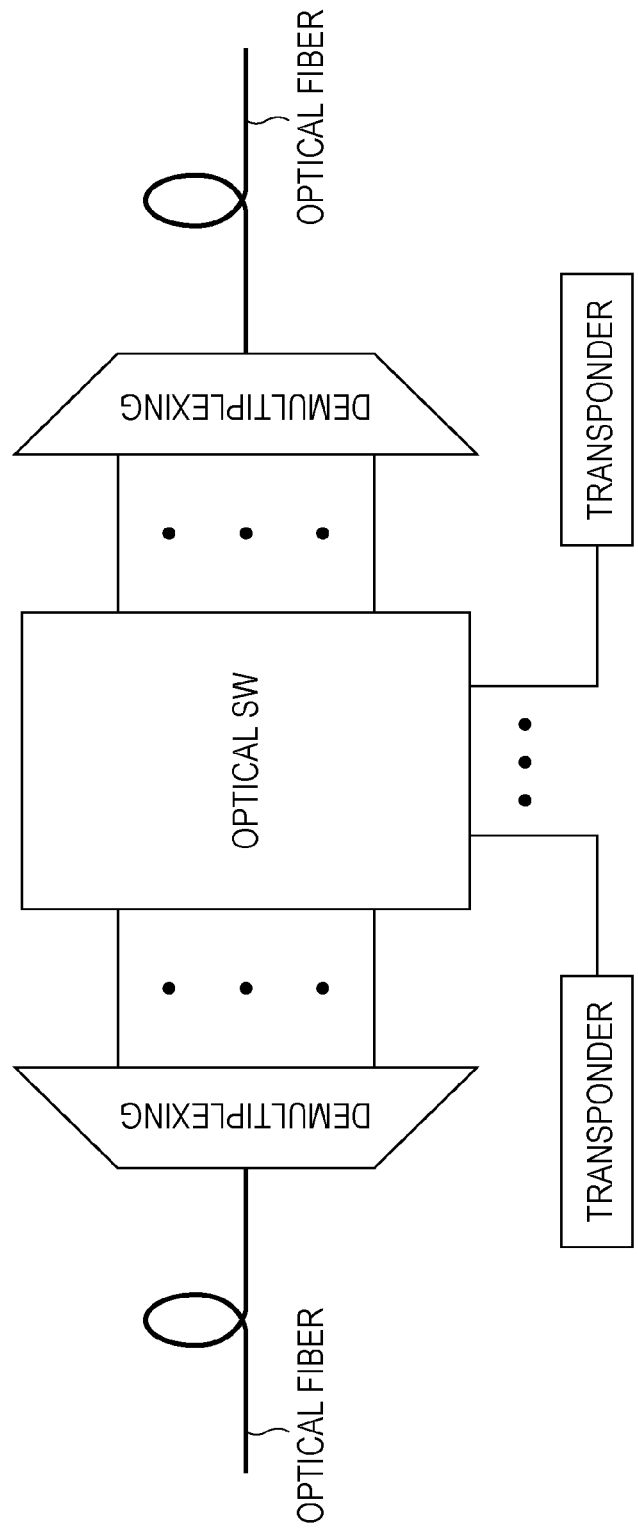
FIG. 2 illustrates a configuration example of an OADM.
Figure 3:
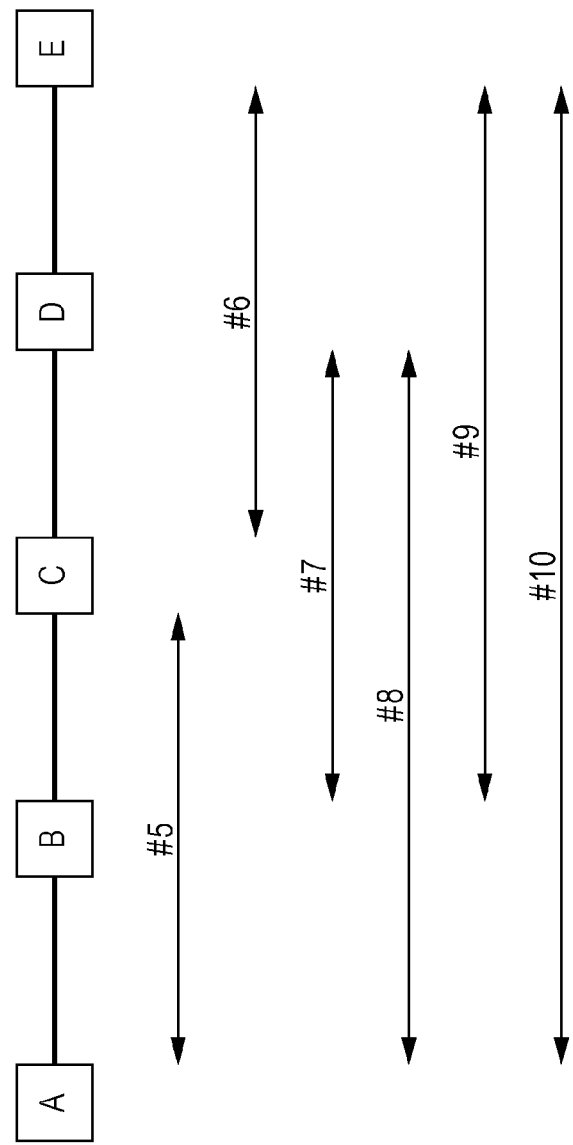
FIG. 3 illustrates an example of a TDM transmission path.
Figure 4:
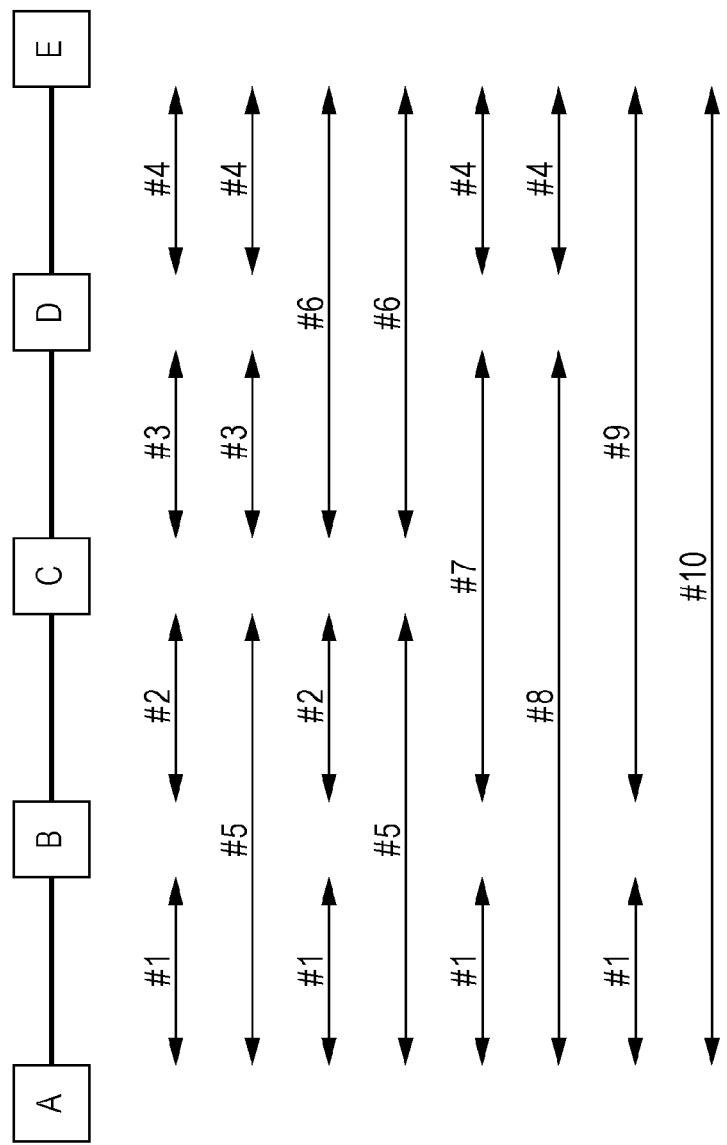
FIG. 4 illustrates an example of a demand accommodating method.
Figure 5:
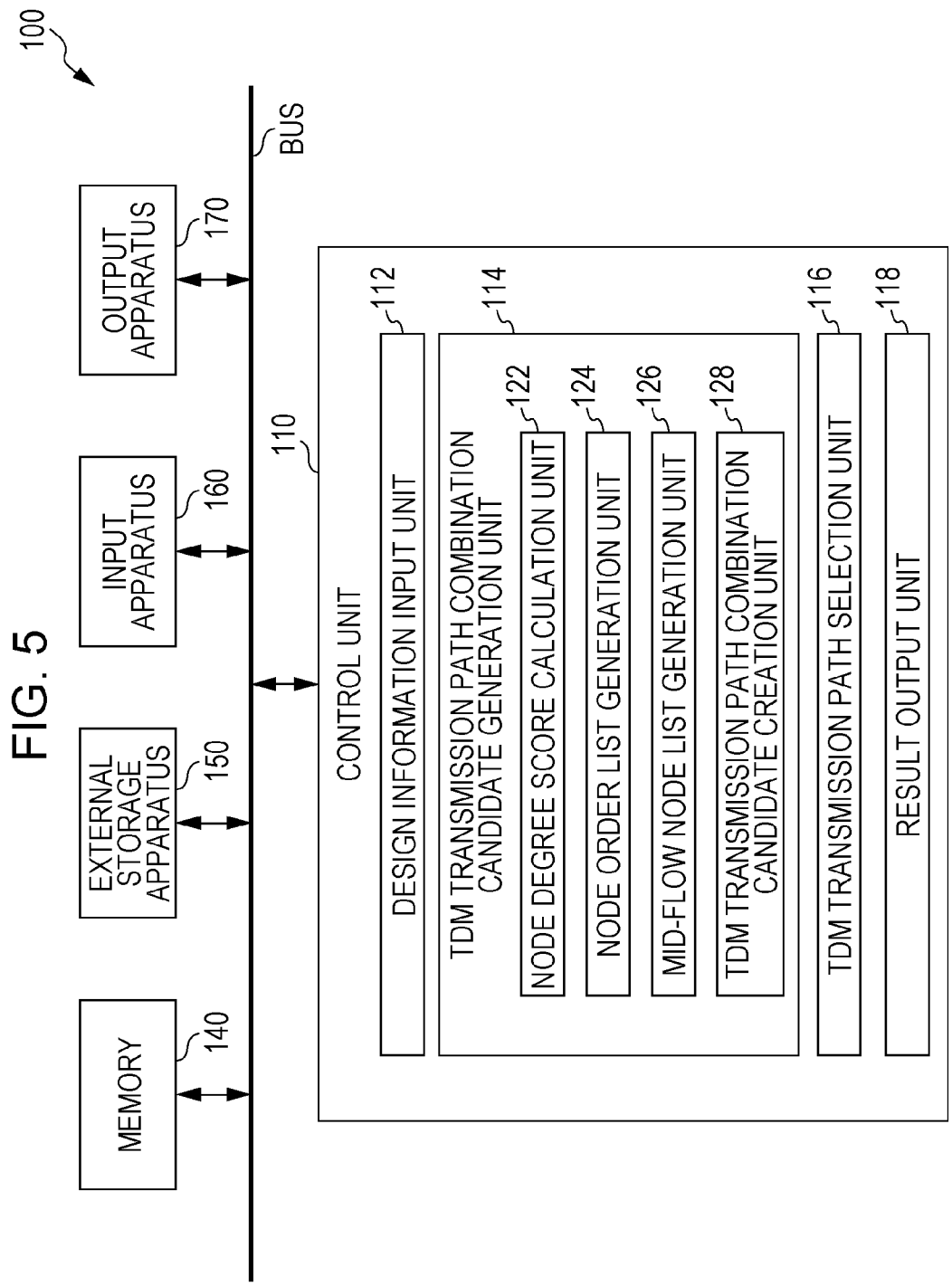
FIG. 5 illustrates a configuration example of a network design apparatus.

FIG. 5 illustrates a configuration example of a network design apparatus. A network design apparatus 100 performs a route design of a network.

The network design apparatus 100 includes a control unit 110, a memory 140, an external storage apparatus 150, an input apparatus 160, and an output apparatus 170. The control unit 110 includes a design information input unit 112, a TDM transmission path combination candidate generation unit 114, a TDM transmission path selection unit 116, and a result output unit 118. The TDM transmission path combination candidate generation unit 114 includes a node degree score calculation unit 122, a node order list generation unit 124, a mid-flow node list generation unit 126, and a TDM transmission path combination candidate creation unit 128.

The control unit 110 controls an entirety of the network design apparatus 100. The memory 140, the external storage apparatus 150, the input apparatus 160, the output apparatus 170, and the like are connected to the control unit 110 via a bus.

The design information input unit 112 accepts an input of design information such as topology information or demand information.

The TDM transmission path combination candidate generation unit 114 generates combination candidates of the TDM transmission paths.

The node degree score calculation unit 122 calculates a degree and a score of the node on the basis of the topology information, the demand information, and the like.

The node order list generation unit 124 generates an order list of the nodes by sorting the nodes on the basis of the degree and the score of the node.

The mid-flow node list generation unit 126 generates a mid-flow node list for each demand.

The TDM transmission path combination candidate creation unit 128 extracts and sorts mid-flow nodes in a demand path for each demand in accordance with the order list of the nodes so that the combination candidates of the TDM transmission paths are generated.

The TDM transmission path selection unit 116 determines the combination of the TDM transmission paths for accommodating the demand from the combination candidates of the TDM transmission paths by the mathematical programming or the like.

The result output unit 118 outputs a design result.

The memory 140 is used as a main storage apparatus of the network design apparatus 100. The memory 140 stores a program of an operating system (OS) and an application program which are executed in the control unit 110. The memory 140 stores various pieces of data used by the program executed in the control unit 110. The memory 140 is an example of a storage unit.

The external storage apparatus 150 is used as a secondary storage apparatus of the network design apparatus 100. The external storage apparatus 150 stores the program of the OS, the application program, various pieces of data, and the like. The various pieces of data, lists, tables, and the like stored in the memory 140 may be stored in the external storage apparatus 150. The external storage apparatus 150 is an example of a storage unit.

The input topology information and demand information and tables such as the order list of the nodes generated by the TDM transmission path combination candidate generation unit 114 may be stored in the memory 140, the external storage apparatus 150, or the like.

The input apparatus 160 accepts the input of the topology information or the like from the operator or the like. The input apparatus 160 is a keyboard, a pointing device, or the like.

The output apparatus 170 outputs the data generated by the control unit 110, and the like. The output apparatus 170 is composed of a display apparatus, a printer, or the like.

The network design apparatus 100 may be realized by using a general-purpose computer such as a personal computer (PC) or a dedicated-use computer such as a server machine.

The computer, that is, an information processing apparatus includes a processor, the main storage apparatus, and the secondary storage apparatus as well as an interface apparatus such as a communication interface apparatus for a peripheral apparatus. The main storage apparatus and the secondary storage apparatus are computer-readable recording media.

The computer may realize a function that conforms to a certain purpose while the processor loads the program stored in the recording medium to a work area of the main storage apparatus, and the peripheral apparatus is controlled through the execution of the program.

The processor is composed, for example, of a central processing unit (CPU) or a digital signal processor (DSP). The main storage apparatus includes, for example, a random access memory (RAM) or a read only memory (ROM).

The secondary storage apparatus is composed, for example, of an erasable programmable ROM (EPROM) or a hard disk drive (HDD). The secondary storage apparatus may also include a removable medium, that is, a portable recording medium. The removable medium is, for example, a Universal Serial Bus (USB) memory or a disc recording medium such as a compact disc (CD) or a digital versatile disc (DVD).

A communication interface apparatus is composed, for example, of a local area network (LAN) interface board or a wireless communication circuit for wireless communication.

The peripheral apparatus includes an input apparatus such as a keyboard or a pointing device, or an output apparatus such as a display apparatus or a printer in addition to the above-mentioned secondary storage apparatus or the communication interface apparatus. The input apparatus may also include a video or image input apparatus such as a camera, or an audio input apparatus such as a microphone. The output apparatus may also include an audio output apparatus such as a speaker.

The computer that realizes the network design apparatus 100 realizes the functions of the design information input unit 112, the TDM transmission path combination candidate generation unit 114, and the like when the processor loads the program stored in the secondary storage apparatus to the main storage apparatus for execution.

The series of processes may be executed by hardware and may also be executed by software.

Steps describing the program include not only processing carried out in a time-series manner that follows the described order but also processing carried out in a parallel manner or individually without carrying out the processing in a time-series manner.

The respective units of the network design apparatus 100 may be realized as hardware components, software components, or a combination of these.

The hardware components are a hardware circuit and include, for example, a field programmable gate array (FPGA), an application specific integrated circuit (ASIC), a gate array, a combination of logic gates, an analog circuit, or the like.

The software components are parts that realize certain processing as the software. The software components are not a concept that limits a language in which the software is realized, a development environment, or the like.

Operation Example

Entire Operation

Figure 6:
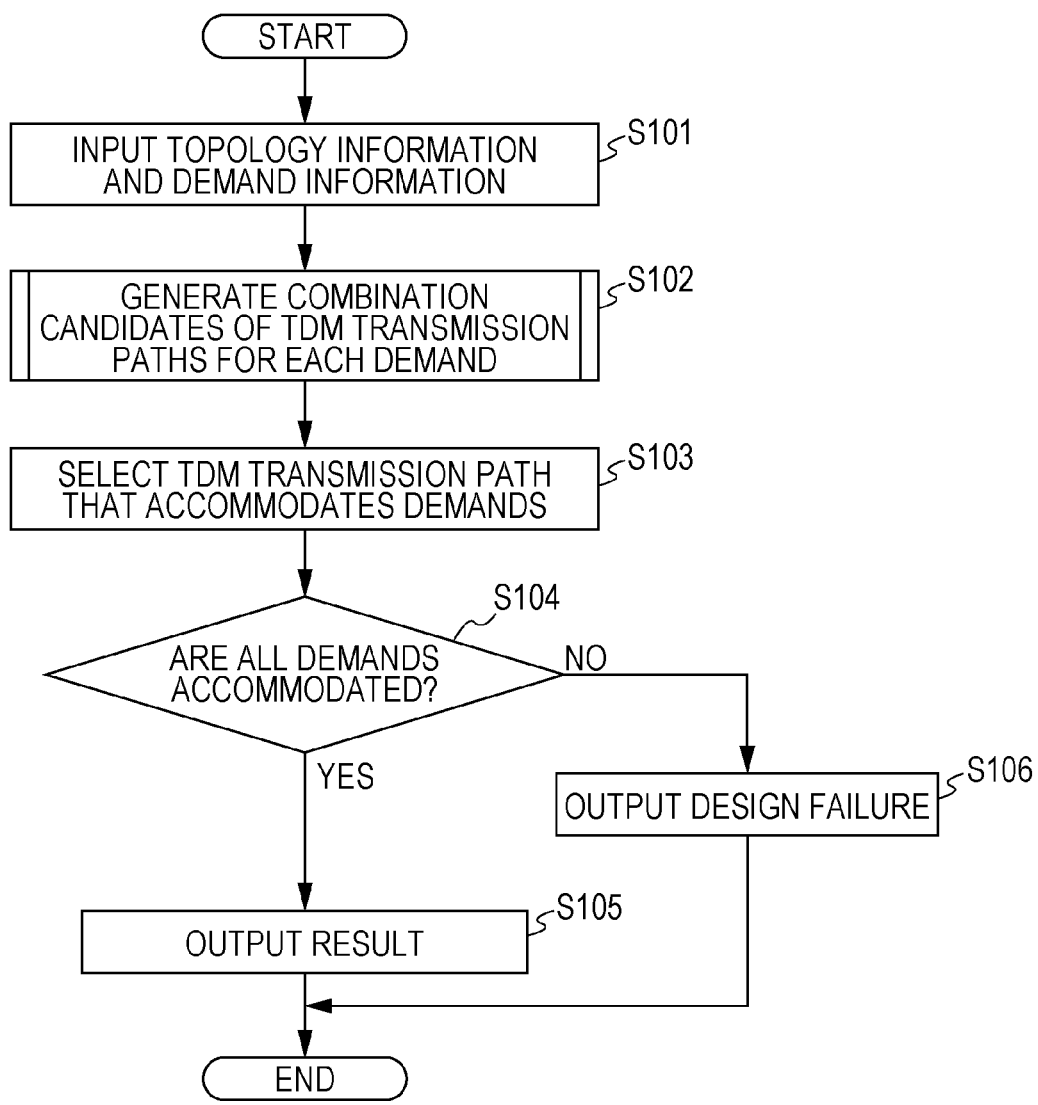
FIG. 6 illustrates an example of an entire operation flow of the network design apparatus according to the present embodiment.

FIG. 6 illustrates an example of an entire operation flow of the network design apparatus according to the present embodiment.

In step S101, the design information input unit 112 of the control unit 110 in the network design apparatus 100 receives inputs of the topology information and the demand information from an operator or the like via the input apparatus 160 and obtains the topology information and the demand information. The design information input unit 112 may also obtain, from the external storage apparatus 150 or the like, the topology information and the demand information stored in advance in the external storage apparatus 150 or the like.

Figure 7:
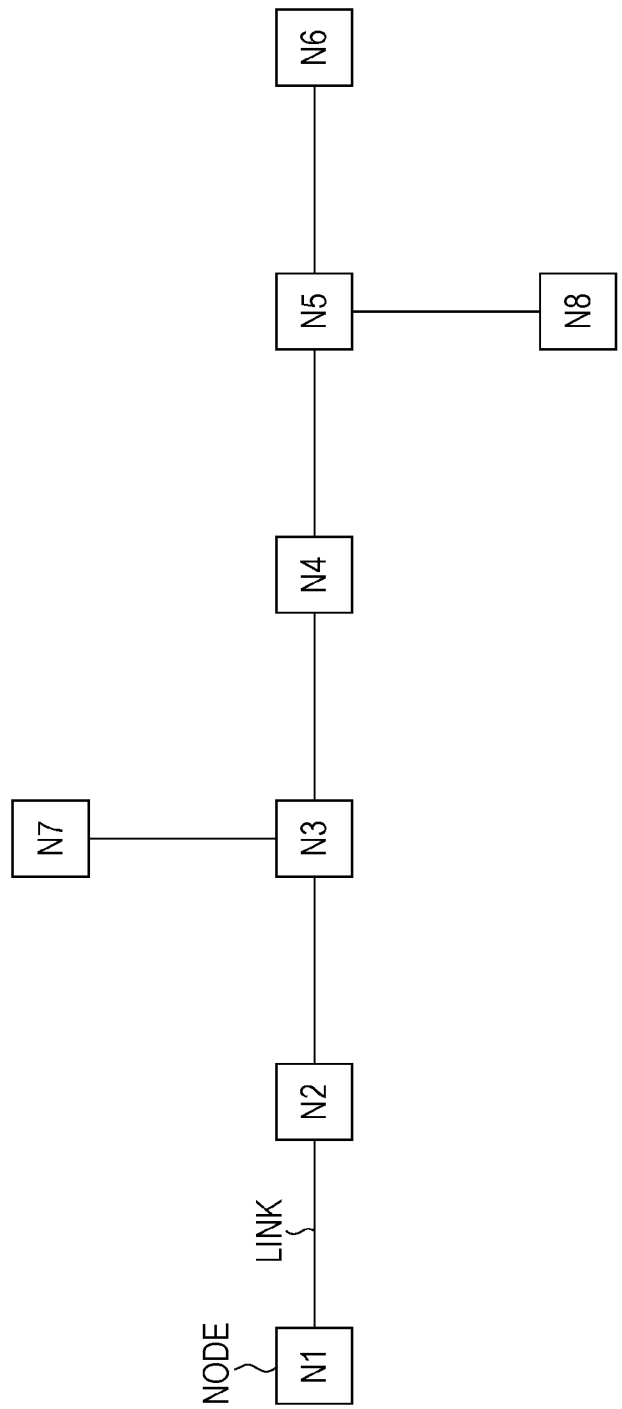
FIG. 7 illustrates an example of a network topology as a target of a route design by the network design apparatus.

FIG. 7 illustrates an example of a network topology as a target of a route design by the network design apparatus. The network topology (topology) is a connection mode of the nodes on the network. The topology is represented, for example, by nodes and a link that connects the nodes to each other. The nodes and the link respectively correspond, for example, to the telephone stations (buildings) and the fiber. The topology information (network topology information) is information representing the network topology. The topology information includes, for example, the node information and the link information.

In the example of FIG. 7, a node N1 is connected to a node N2. The node N2 is connected to the node N1 and a node N3. The node N3 is connected to the node N2, a node N4, and a node N7. The node N4 is connected to the node N3 and a node N5. The node N5 is connected to the node N4, a node N6, and a node N8. The node N6 is connected to the node N5. The node N7 is connected to the node N3. The node N8 is connected to the node N5.

FIG. 8 illustrates an example of node information. The node information is, for example, a list of node names. The node information is stored in the memory 140.

FIG. 9 illustrates an example of link information. The link information includes the starting point node and the ending point node of the link connecting between the nodes. The link information may also include a distance of the optical fiber for each link. The link information may also include a wavelength number that may be utilized in the WDM. In a case where the same WDM devices are introduced across an entire network, a single wavelength number common across the entire network may also be adopted instead of wavelength numbers that may be utilized for respective links. The link information is stored in the memory 140.

Figure 10:
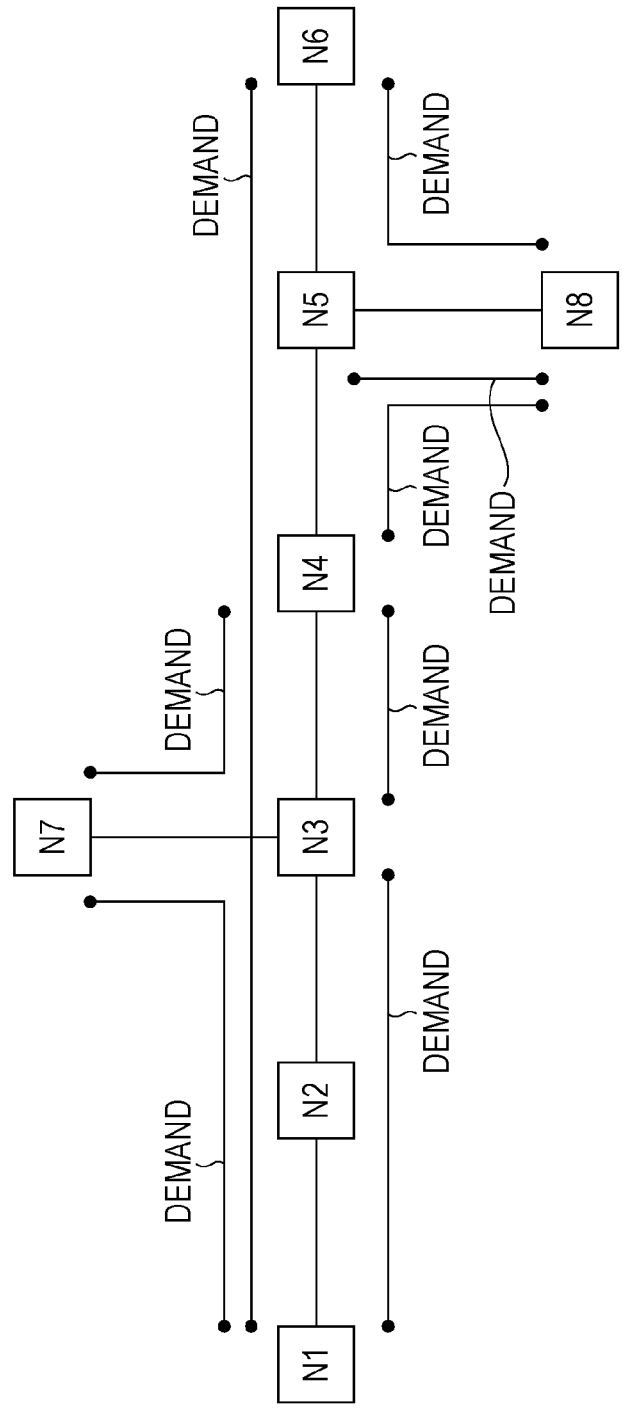
FIG. 10 illustrates an example of demands in the network topology illustrated in FIG. 7.

FIG. 10 illustrates an example of demands in the network topology illustrated in FIG. 7. In the example of FIG. 10, the demands exist between the node N1 and the node N3, between the node N1 and the node N6, between the node N1 and the node N7, between the node N3 and the node N4, between the node N4 and the node N7, between the node N4 and the node N8, and the like. The demand information is information representing the demand.

FIG. 11 illustrates an example of the demand information. The demand information includes, for example, a starting point node, an ending point node, a band, the number of demands, and a route. The route is represented, for example, by the starting point node, the ending point node, and a via node between the starting point node and the ending point node. The route of the demand may also be determined by a shortest route search or the like. The demand information is stored in the memory 140.

The route of the demand may also be represented by all the links through which the demand passes. For example, the route of the demand between the node N1 and the node N3 may be represented as the link between the nodes N1 and N2 and the link between the nodes N2 and N3.

The route of the demand may also be represented by all the nodes through which the demand passes (including the starting point node and the ending point node) and all the links. For example, the route of the demand between the node N1 and the node N3 may be represented as the node N1, the link between the nodes N1 and N2, the node N2, the link between the nodes N2 and N3, and the node N3.

With reference to FIG. 6 again, in step S102, the TDM transmission path combination candidate generation unit 114 of the network design apparatus 100 generates combination candidates of the TDM transmission paths that accommodate the demands. The generation of the combination candidates of the TDM transmission paths for accommodating the demand will be described in detail below.

In step S103, the TDM transmission path selection unit 116 selects the combination of the TDM transmission paths that accommodate the respective demands from the TDM transmission path combination candidates generated by the TDM transmission path combination candidate generation unit 114. For example, the mixed integer programming or the like may be used for the selection of the combination of the TDM transmission paths that accommodate the respective demands.

In step S104, the TDM transmission path selection unit 116 checks whether all the demands are accommodated in any of the TDM transmission path combinations. In a case where all the demands are accommodated in any of the TDM transmission path combinations (S104; YES), the result output unit 118 outputs the combination of the TDM transmission paths that accommodate each demand with regard to all the demands (S105), and the processing ends.

In a case where at least one of the demands is not accommodated in any of the TDM transmission path combinations (S104; NO), the result output unit 118 outputs a failure of the network design (S106), and the processing ends. An operator then attempts to perform a network design by another method in a case where the failure of the network design is output.

Operation for generating TDM transmission path combination candidates

Figure 12:
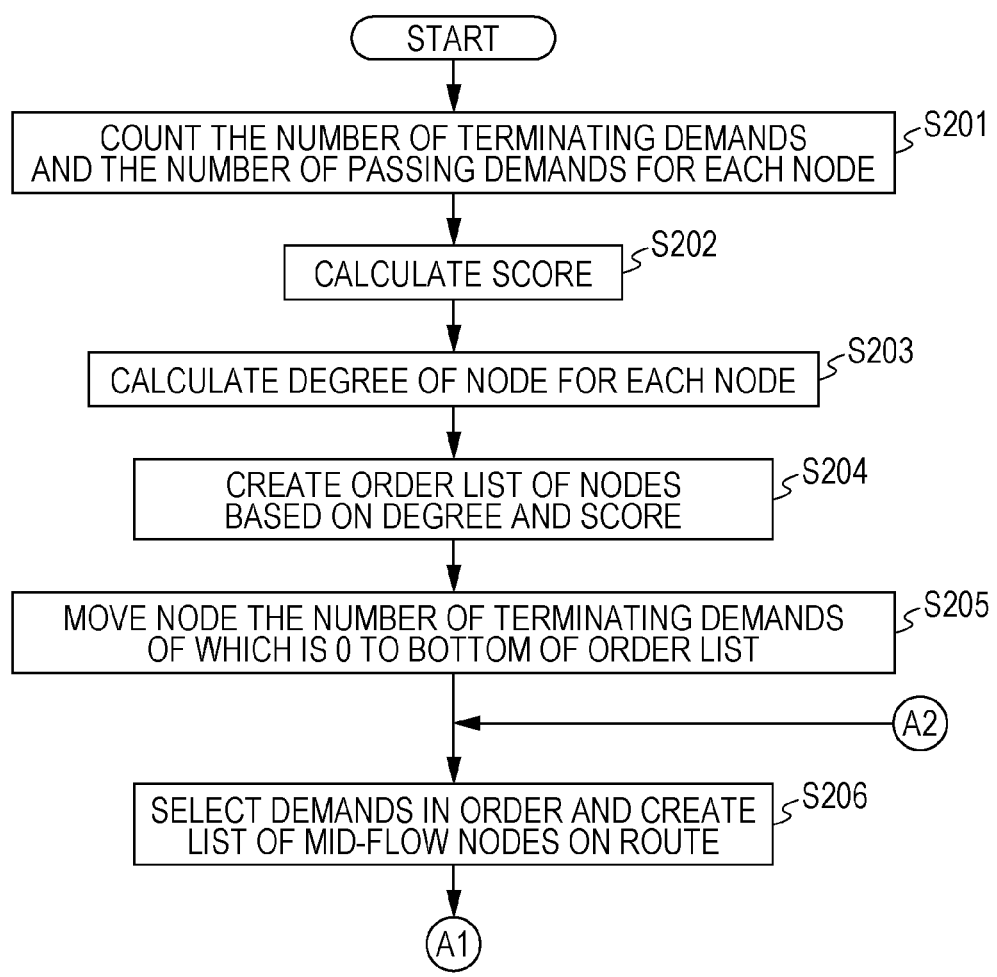
FIG. 12 illustrates an example (1) of an operation flow for creating combination candidates of the TDM transmission paths in the network design apparatus.
Figure 13:
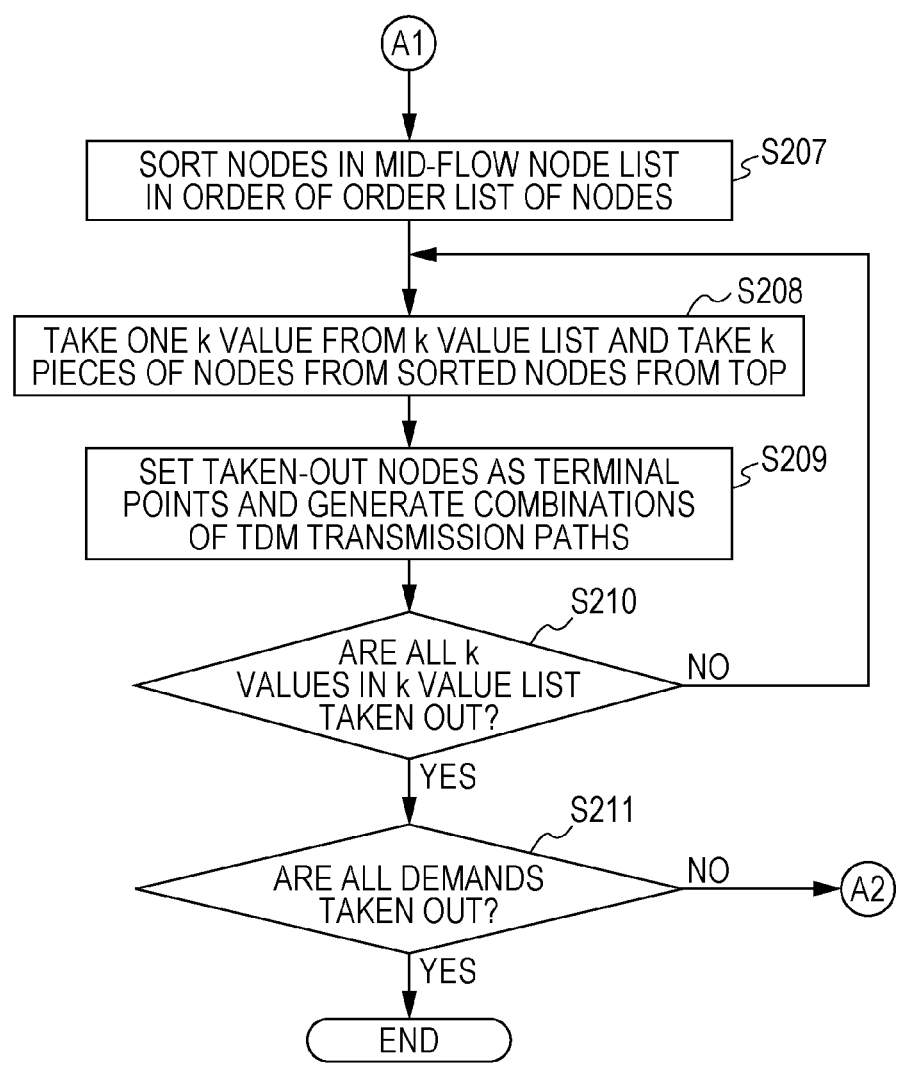
FIG. 13 illustrates an example (2) of the operation flow for creating the combination candidates of the TDM transmission paths in the network design apparatus.

FIG. 12 and FIG. 13 illustrate examples of an operation flow for creating TDM transmission path combination candidates in the network design apparatus. "A1" and "A2" in FIG. 12 are respectively connected to "A1" and "A2" in FIG. 13.

In step S201, the node degree score calculation unit 122 counts the number of the terminating demands and the number of the passing demands for each node. The node degree score calculation unit 122 extracts the nodes included in the node information and the demands included in the demand information from the memory 140. The node degree score calculation unit 122 counts the number of the demands terminating at the node and the number of the demands passing through the node with regard to the respective nodes included in the node information. The number of the terminating demands may be obtained by adding the demands included in the starting point nodes or the ending point nodes included in FIG. 11 with regard to the respective nodes included in the node information in FIG. 8. For example, with regard to the number of the demands terminating at the node N1, the number of the demand between the nodes N1 and N3 is 1, the number of the demand between the nodes N1 and N6 is 1, and the number of the demands between the nodes N1 and N7 is 2, so that the total is 4. The number of the passing demands may be obtained by adding the demands where the node appears at a mid-flow locations excluding the starting point node and the ending point node among the nodes included on the routes for the demands included in FIG. 11 with regard to the respective nodes included in the node information of FIG. 8. For example, in the case of the demand between the nodes N1 and N6, the route includes the nodes N1, N2, N3, N4, N5, and N6. Since the node N1 serving as the starting point node and the node N6 serving as the ending point node are excluded, the passing nodes are the nodes N2, N3, N4, and N5. That is, for example, the demand between the nodes N1 and N6 is a demand passing through the node N2. With regard to the number of the demands passing through the node N2, the number of the demand between the nodes N1 and N3 is 1, the number of the demand between the nodes N1 and N6 is 1, and the number of the demands between the nodes N1 and N7 is 2, so that the total is 4.

In step S202, the node degree score calculation unit 122 calculates the score of the node for each node. The score of the node is a sum of the number of the demands terminating at the node (the number of the terminating demands) and the number of the demands passing through the node (the number of the passing demands).

FIG. 14 illustrates an example of the number of the terminating demands, the number of the passing demands, and a score for each node. The number of the terminating demands, the number of the passing demands, and the score for each node is stored in the memory 140.

In step S203, the node degree score calculation unit 122 obtains a degree of the node for each node. The degree of the node is the number of links extending from the node. For example, two links including a link between the nodes N1 and N2 and a link between the nodes N2 and N3 extend from the node N2 in the network topology of FIG. 7. Therefore, the degree of the node N2 is 2. Similarly, the degree of the node N3 is 3.

FIG. 15 illustrates an example of a degree of the node in the network topology in FIG. 7. In FIG. 15, for example, the degree of the node N1 is 1.

In step S204, the node order list generation unit 124 generates the order list of the nodes on the basis of the degree and the score of the node. The node order list generation unit 124 arranges the nodes in the descending order from the higher degree of the node. When the degree of the node is obtained as illustrated in FIG. 15, the order of the nodes is N3, N5, N2, N4, N1, N6, N7, and N8 from the higher degree of the node. Herein, with regards to the nodes having the same degree, the node having a higher score is arranged higher in the order list. The node N3 and the node N5 have the same node degree at 3, but the score of the node N3 is 7, and the score of the node N5 is 5, so that the node N3 is arranged higher in the order list. Similarly, the node N2 and the node N4 have the same node degree at 2, but the scores of the node N2 and the node N4 are 4 and 5, respectively, so that the node N4 is arranged higher in the order list. Furthermore, the node N1, the node N6, the node N7, and the node N8 have the same node degree at 1, but the scores of the node N1, the node N6, the node N7, and the node N8 are 4, 2, 3, and 4, respectively, so that the order is N1, N8, N7, and N6. Therefore, the order of the nodes is N3, N5, N4, N2, N1, N8, N7, and N6.

In step S205, the node order list generation unit 124 further moves the node the number of the terminating demands of which is 0 to a bottom of the order in the order list of the nodes generated in step S204. In the example of FIG. 14, since the number of the terminating demands of the node N2 is 0, the node N2 is moved to the bottom of the order list of the nodes. Therefore, the order of the nodes is N3, N5, N4, N1, N8, N7, N6, and N2. A node that does not have a terminating demand has a low probability of creating a TDM transmission path including the node as the terminal point. For that reason, the processing in step S205 is performed to avoid a situation where a node having no terminating demand becomes a terminal point of a TDM transmission path. As described above, in the example of FIG. 14, the number of the terminating demands of the node N2 is 0. For example, the shortest demand among the demands passing through the node N2 is the demand between the nodes N1 and N3. With regard to the demand between the nodes N1 and N3, when the demand is transmitted by the single TDM transmission path between the nodes N1 and N3, the number of TDM transmission paths is lower as compared with a case where the demand is transmitted by two separate paths including the TDM transmission path between the nodes N1 and N2 and the TDM transmission path between the nodes N2 and N3. It is conceivable that as the number of TDM transmission paths is lower, the solution is closer to the optimal solution, and to exclude the combinations of the TDM transmission paths that are unlikely to be the optimal solution as many as possible, the node N2 is moved to the bottom of the order.

FIG. 16 illustrates an example (1) of the order list of the nodes generated by the node order list generation unit 124. In the example of FIG. 16, the nodes are sequentially arranged from the higher rank.

FIG. 17 illustrates an example (1) of the order list of the nodes generated by the node order list generation unit 124. In the example of FIG. 17, the rank of the node is illustrated for each node. The order list of FIG. 17 may be used instead of the order list of FIG. 16.

In step S206, the mid-flow node list generation unit 126 generates the mid-flow node list for each demand. The mid-flow node list generation unit 126 takes out one demand (which is a demand in process) from the demand information and takes out a mid-flow node on the route of the demand. The mid-flow node on the route of the demand is a node through which the demand passes. For example, the mid-flow node list generation unit 126 takes out the node N2, the node N3, the node N4, and the node N5 that are the mid-flow nodes on the route of the demand with respect to the demand between the nodes N1 and N6. The mid-flow node list generation unit 126 stores the taken-out nodes in the memory 140 as the mid-flow node list. The mid-flow node list is generated for each demand.

FIG. 18 illustrates an example of a mid-flow node list. The example of FIG. 18 is an example of the mid-flow node list for the demand between the nodes N1 and N6. The mid-flow nodes of the demand between the nodes N1 and N6 are the node N2, the node N3, the node N4, and the node N5. The mid-flow node list is stored in the memory 140.

In step S207, the mid-flow node list generation unit 126 sorts the nodes in the mid-flow node list while following the order list with regard to the demands in process. The mid-flow node list generation unit 126 sorts the mid-flow nodes of the demand between the nodes N1 and N6 in the order of N3, N5, N4, and N2.

FIG. 19 illustrates an example of a sorted mid-flow node list. The example of FIG. 19 is an example of the sorted mid-flow node list of the demand between the nodes N1 and N6. The mid-flow nodes of the demand between the nodes N1 and N6 are sorted in the order of N3, N5, N4, and N2. The sorted mid-flow node list is generated for each demand. The sorted mid-flow node list is stored in the memory 140.

In step S208, the TDM transmission path combination candidate creation unit 128 takes out one k value from a k value list with regard to the demand in process and takes out k nodes from the sorted mid-flow node list from a higher rank. The TDM transmission path combination candidate creation unit 128 does not take out the node from the sorted mid-flow node list when the value of k is 0. The k value list is a list representing the possible values of k for each demand. For example, in a case where the value of k is 2 with regard to the demand between the nodes N1 and N6, the taken-out nodes are the node N3 and the node N5 that are the two nodes at the higher rank in FIG. 19.

FIG. 20 illustrates an example of a k value list. The k value list represents the possible values of k for each demand. For example, with regard to the demand between the nodes N1 and N6, the possible values of k are 0, 1, 2, and 3. The values of k for each demand are determined in advance. The k value list is stored in the memory 140.

In step S209, the TDM transmission path combination candidate creation unit 128 sets the starting point node, the ending point node, and the nodes taken out in step S208 as the terminal points to generate the combinations of the TDM transmission paths with regard to the demand in process. In a case where the nodes are not taken out in step S208, the TDM transmission path combination candidate creation unit 128 sets the TDM transmission path having the starting point node and the ending point node as the terminal points as the combination of the TDM transmission paths.

For example, in a case where the value of k is 2 with regard to the demand between the nodes N1 and N6, the taken-out nodes are the node N3 and the node N5. At this time, the TDM transmission path combination candidate creation unit 128 creates the combination of the TDM transmission paths including the node N1 serving as the starting point node, the node N6 serving as the ending point node, and the taken-out node N3 and node N5, as the terminal points. The TDM transmission path combination candidate creation unit 128 sorts the node N1 serving as the starting point node, the node N6 serving as the ending point node, and the taken-out node N3 and node N5, in the order from the starting point to the ending point on the route of the demand. Herein, the order after the sort is N1, N3, N5, and N6. The TDM transmission path combination candidate creation unit 128 sets the TDM transmission path between the adjacent two nodes of the sorted nodes. To elaborate, the TDM transmission path combination candidate creation unit 128 sets the TDM transmission path between the nodes N1 and N3, the TDM transmission path between the nodes N3 and N5, and the TDM transmission path between the nodes N5 and N6. That is, the TDM transmission path combination candidate creation unit 128 creates the combination candidate {N1-N3, N3-N5, and N5-N6} of the TDM transmission paths.

Herein, a part of or an entirety of the TDM transmission paths included in the combination of the TDM transmission paths are not mutually overlapped. To elaborate, for example, the TDM transmission path combination candidate creation unit 128 does not create the combination of the TDM transmission paths including the TDM transmission path between the nodes N1 and N5, the TDM transmission path between the nodes N5 and N3, and the TDM transmission path between the nodes N3 and N6.

For example, in a case where the value of k is 3 for the demand between the nodes N1 and N6, the taken-out nodes are the node N3, the node N4, and the node N5. At this time, the TDM transmission path combination candidate creation unit 128 creates the combination of the TDM transmission paths including the node N1 serving as the starting point node, the node N6 serving as the ending point node, and the taken-out node N3, node N4, and node N5, as the terminal points. The TDM transmission path combination candidate creation unit 128 sorts the node N1 serving as the starting point node, the node N6 serving as the ending point node, and the taken-out node N3, node N4, and node N5, in the order from the starting point to the ending point on the route of the demand. Herein, the order after the sort is N1, N3, N4, N5, and N6. The TDM transmission path combination candidate creation unit 128 sets the TDM transmission path between the adjacent two nodes of the sorted nodes. To elaborate, the TDM transmission path combination candidate creation unit 128 sets the TDM transmission path between the nodes N1 and N3, the TDM transmission path between the nodes N3 and N4, the TDM transmission path between the nodes N4 and N5, and the TDM transmission path between the nodes N5 and N6. That is, the TDM transmission path combination candidate creation unit 128 creates the combination candidate {N1-N3, N3-N4, N4-N5, and N5-N6} of the TDM transmission paths.

In a case where the value of k is 1 for the demand between the nodes N1 and N6, the taken-out node is the node N3. At this time, the TDM transmission path combination candidate creation unit 128 creates the combination of the TDM transmission paths including the node N1 serving as the starting point node, the node N6 serving as the ending point node, and the taken-out node N3, as the terminal points. The TDM transmission path combination candidate creation unit 128 sorts the node N1 serving as the starting point node, the node N6 serving as the ending point node, and the taken-out node N3, in the order from the starting point to the ending point on the route of the demand. Herein, the order after the sort is N1, N3, and N6. The TDM transmission path combination candidate creation unit 128 sets the TDM transmission path between the adjacent two nodes of the sorted nodes. To elaborate, the TDM transmission path combination candidate creation unit 128 sets the TDM transmission path between the nodes N1 and N3 and the TDM transmission path between the nodes N3 and N6. That is, the TDM transmission path combination candidate creation unit 128 creates the combination candidate {N1-N3 and N3-N6} of the TDM transmission paths.

In a case where the value of k is 0 for the demand between the nodes N1 and N6, the taken-out node does not exist. At this time, the TDM transmission path combination candidate creation unit 128 creates the combination of the TDM transmission paths including the node N1 serving as the starting point node and the node N6 serving as the ending point node, as the terminal points. The TDM transmission path combination candidate creation unit 128 sets the TDM transmission paths between the nodes N1 and N6. That is, the TDM transmission path combination candidate creation unit 128 creates the combination candidate {N1-N6} of the TDM transmission paths.

Figure 21:
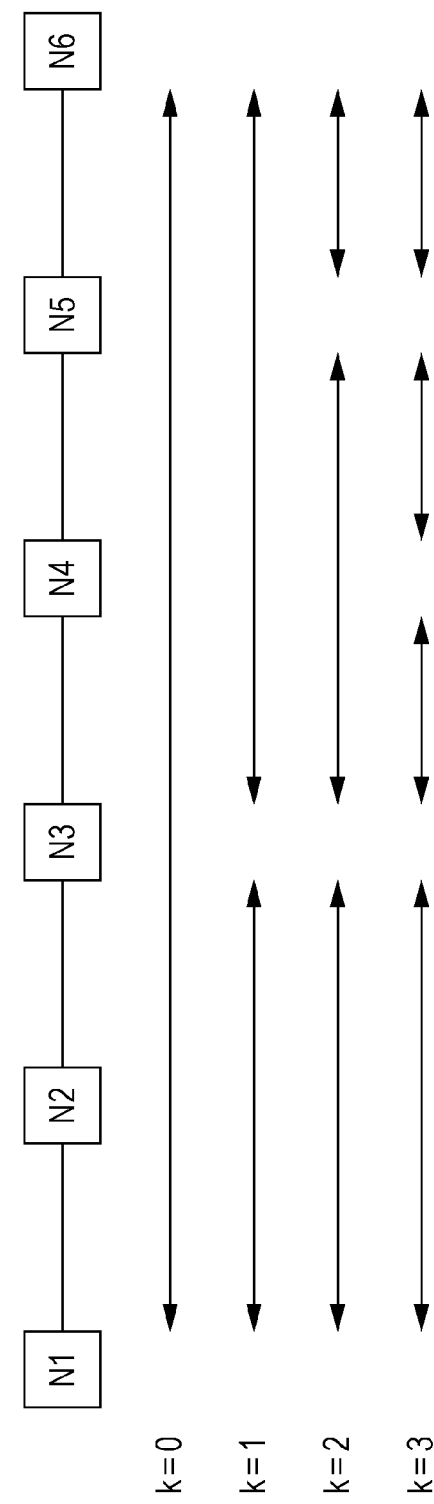
FIG. 21 illustrates an example of four combination candidates of TDM transmission paths of demands.

FIG. 21 illustrates an example of four combination candidates of the TDM transmission paths of the demands between the nodes N1 and N6. In the example of FIG. 21, the four combination candidates {N1-N6}, {N1-N3 and N3-N6}, {N1-N3, N3-N5, and N5-N6}, and {N1-N3, N3-N4, N4-N5, and N5-N6} of the TDM transmission paths are set between the nodes N1 and N6.

Since two demands having the same starting point node and the same ending point node as well as the same value of k have the same combination candidates of the TDM transmission paths, the combination candidates of the TDM transmission paths for these demands may collectively be created.

In step S210, the TDM transmission path combination candidate creation unit 128 checks whether or not all the values of k are taken out from the k value list with regard to the demand in process and the TDM transmission path combination candidates are created. In a case where all the value of k are taken out from the k value list with regard to the demand in process (S210;YES), the processing proceeds to step S211. In a case where all the value of k are not taken out from the k value list with regard to the demand in process (S210; NO), the processing returns to step S208.

In step S211, the TDM transmission path combination candidate creation unit 128 checks whether or not all the demands are taken out and the series of processes are conducted. In a case where an unprocessed demand still exists (S211; NO), the processing returns to step S206. In a case where all the demands are taken out and the series of processes are conducted (S211; YES), the processing ends.

The network design apparatus 100 generates the combination candidates of the TDM transmission paths with regard to the demands (FIG. 11) in the obtained topology (FIG. 7) and selects the combination of the TDM transmission paths that accommodate the respective demands on the basis of the generated combination candidates of the TDM transmission paths.

FIG. 22 illustrates an example of TDM transmission path combination candidates to be generated. The combination candidates of the TDM transmission paths are generated for each demand as represented in FIG. 22. The number of combination candidates of the TDM transmission paths is the same number as the value of k of the respective demands. For example, a number of the value of k is four since k=0, 1, 2, or 3 for the demands between the nodes N1 and N6, and the number of combination candidates of the TDM transmission paths is therefore 4.

According to the network design apparatus 100 based on the above-mentioned operation example, it is possible to conduct the network design while narrowing down the combination candidates of the TDM transmission paths to those having a high probability of being the optimal solution by using the degree of the node, the number of the demands terminating at the node, and the number of the demands passing through the node.

First Modified Example

Next, a first modified example will be described. The first modified example has a common point with the above-mentioned operation example. Therefore, a different point will mainly be described, and the description of the common point will be omitted.

According to the above-mentioned operation example, the previously specified number of nodes are taken out from the mid-flow nodes on the route except for the starting point node and the ending point node of the demand for each demand. According to the first modified example, the processing ends when the number of taken-out mid-flow nodes exceeds the number of mid-flow nodes on the route while the number of taken-out mid-flow nodes is sequentially increased or when a non-selectable node is included.

Figure 23:
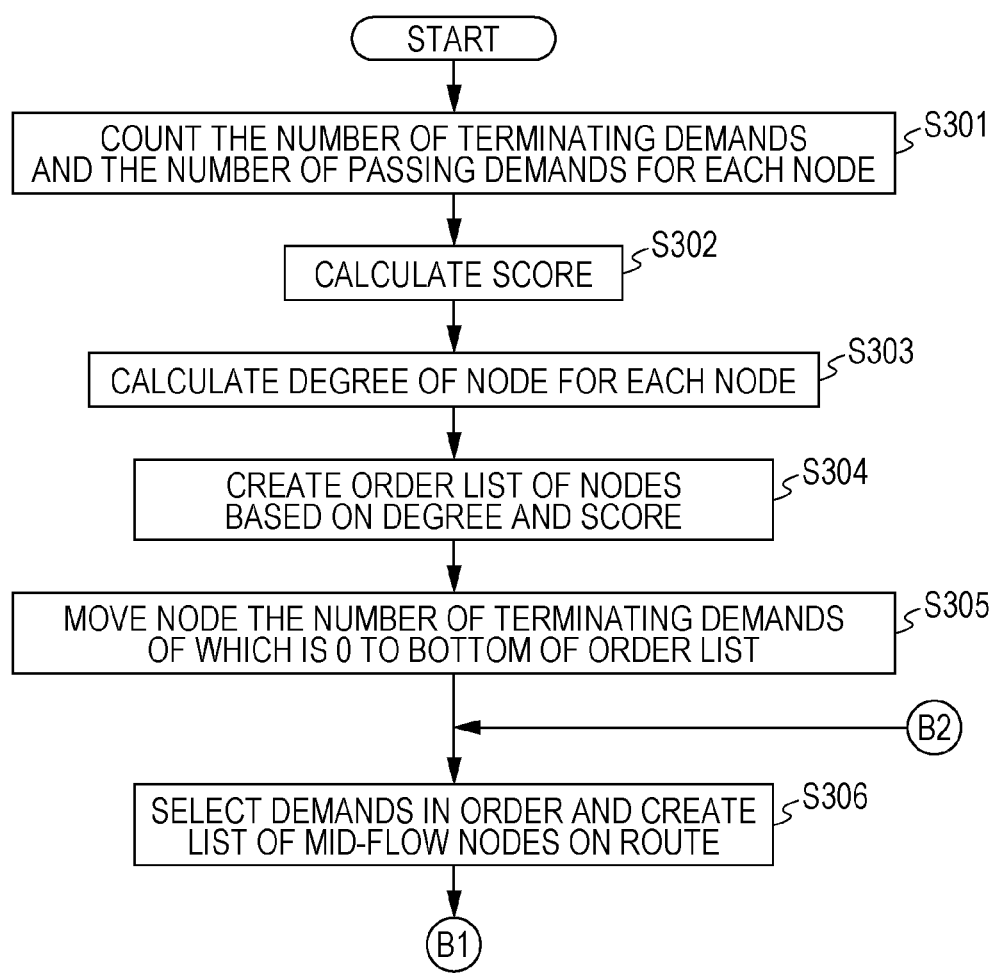
FIG. 23 illustrates an example (1) of an operation flow for generating combination candidates of the TDM transmission paths according to a first modified example.
Figure 24:
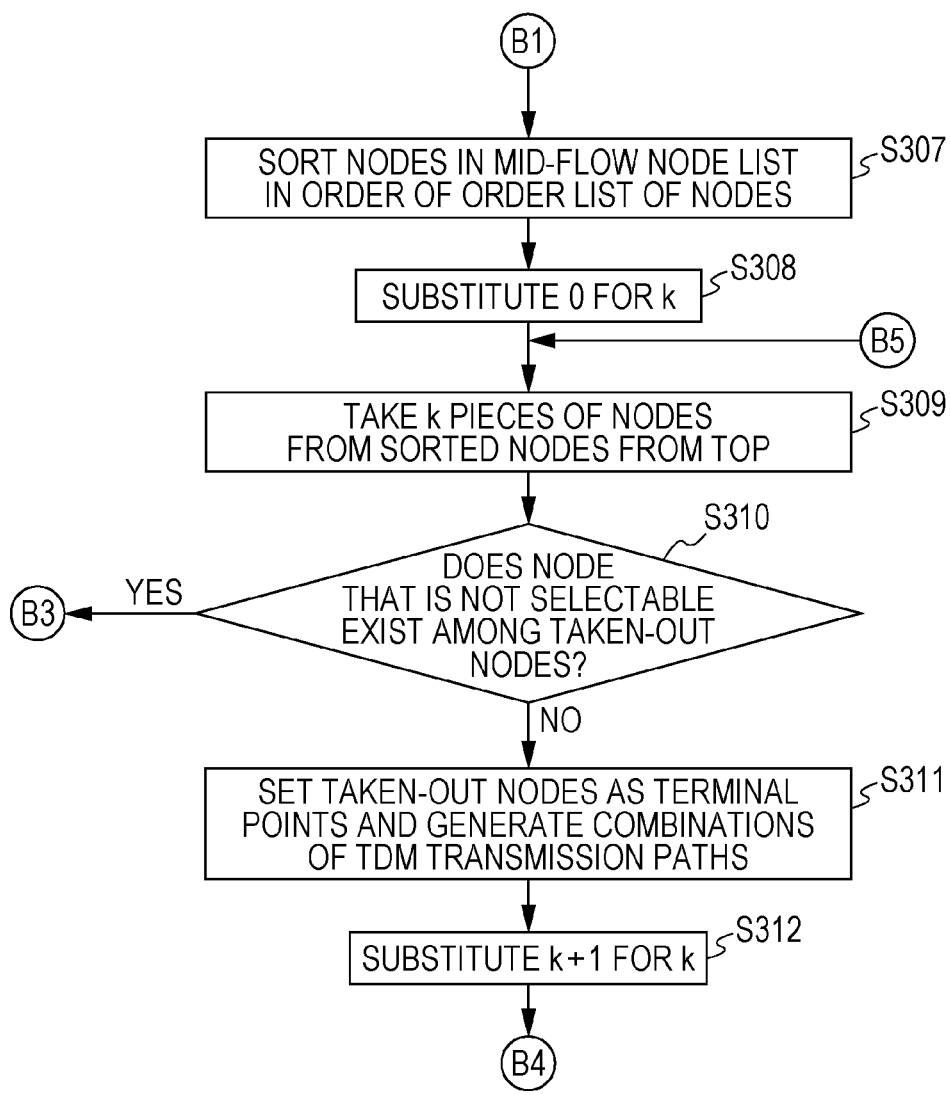
FIG. 24 illustrates an example (2) of the operation flow for generating the combination candidates of the TDM transmission paths according to the first modified example.
Figure 25:
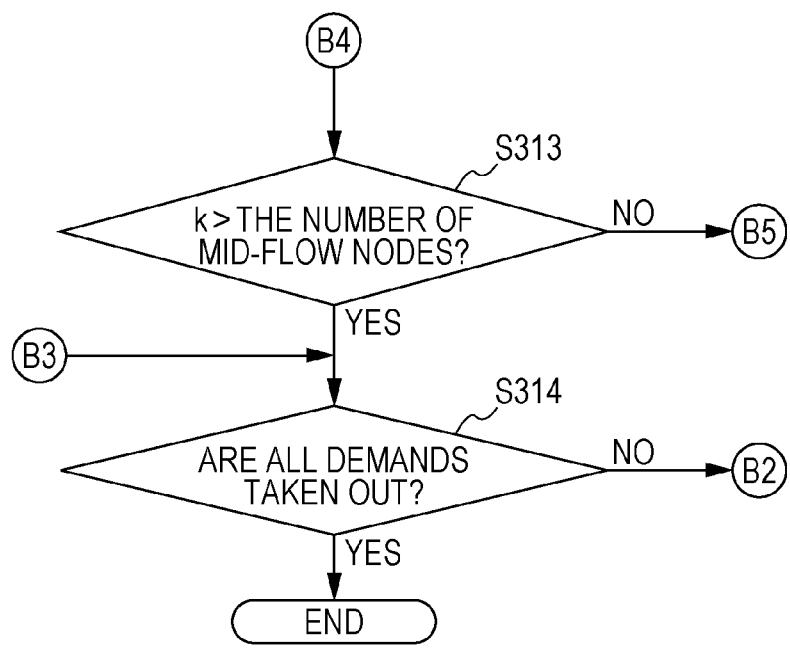
FIG. 25 illustrates an example (3) of the operation flow for generating the combination candidates of the TDM transmission paths according to the first modified example.

FIG. 23, FIG. 24, and FIG. 25 illustrate an example of an operation flow for generating the combination candidates of the TDM transmission paths according to the first modified example. "B1" and "B2" of FIG. 23 are respectively connected to "B1" of FIG. 24 and "B2" of FIG. 25. "B3", "B4", and "B5" of FIG. 24 are respectively connected to "B3", "B4", and "B5" of FIG. 25.

The operation in step S301 to step S304 of FIG. 23 is similar to the operation in step S201 to step S204 of FIG. 12 of the above-mentioned operation example.

In step S305, the node order list generation unit 124 moves the node the number of the terminating demands of which is 0 to the bottom of the ranks in the order list of the nodes generated in step S304. Furthermore, the node order list generation unit 124 assigns a non-selectable flag to the node moved at the last.

FIG. 26 illustrates an example of a non-selectable flag for the node. In the example of FIG. 26, each node is assigned with "true" or "false". Herein, "true" indicates selectable, and "false" indicates non-selectable.

The operation in step S306 and step S307 is similar to the operation in step S206 and step S207 of the above-mentioned operation example.

In step S308, the TDM transmission path combination candidate creation unit 128 prepares a variable k and substitutes an initial value 0 for the variable k.

In step S309, the TDM transmission path combination candidate creation unit 128 takes out k nodes from the higher rank of the sorted mid-flow node list with regard to the demand in process. The TDM transmission path combination candidate creation unit 128 does not take out the node from the sorted mid-flow node list when the value of k is 0. The k value list is a list representing possible values of k for each demand. For example, in a case where the value of k is 2 with regard to the demands between the nodes N1 and N6, the taken-out nodes are the node N3 and the node N5 that are the two nodes at the higher rank of FIG. 19.

In step S310, the TDM transmission path combination candidate creation unit 128 checks whether or not the node assigned with the non-selectable flag is included among the nodes taken out in step S309. In a case where the node assigned with the non-selectable flag is included (S310; YES), the processing proceeds to step S314. In a case where the node assigned with the non-selectable flag is not included (S310; NO), the processing proceeds to step S311.

In step S311, the TDM transmission path combination candidate creation unit 128 sets the starting point node, the ending point node, and the nodes taken out in step S309 as the terminal points to generate the combination of the TDM transmission paths with regard to the demand in process. In a case where the nodes are not taken out in step S309, the TDM transmission path combination candidate creation unit 128 generates the TDM transmission path including the starting point node and the ending point node as the terminal points, as the combination of the TDM transmission paths.

In step S312, the TDM transmission path combination candidate creation unit 128 substitutes k+1 for the variable k.

In step S313, the TDM transmission path combination candidate creation unit 128 checks whether or not the variable k exceeds the number of mid-flow nodes on the route with regard to the demand in process. In a case where the variable k exceeds the number of mid-flow nodes on the route with regard to the demand in process (S313; YES), the processing proceeds to step S314. In a case where the variable k does not exceed the number of mid-flow nodes on the route with regard to the demand in process (S313; NO), the processing returns to step S309.

In step S314, the TDM transmission path combination candidate creation unit 128 checks whether or not all the demands are taken out and the series of processes are conducted. In a case where an demand to be processed still exists (S314; NO), the processing returns to step S306. In a case where all the demands are taken out and the series of processes are conducted (S314; YES), the processing ends.

According to the network design apparatus 100 based on the above-mentioned first modified example, a prearranged decision on the number of the nodes to be taken out may be avoided since the number of the nodes to be selected is automatically increased and the selection may be made.

Second Modified Example

Next, a second modified example will be described. The second modified example has a common point with the above-mentioned operation example and the first modified example. Therefore, a different point will mainly be described, and the description of the common point will be omitted.

According to the second modified example, processing in a case where nodes having the same node degree and the same total number of the terminating demands and passing demands exist is added to the above-mentioned operation example.

Figure 27:
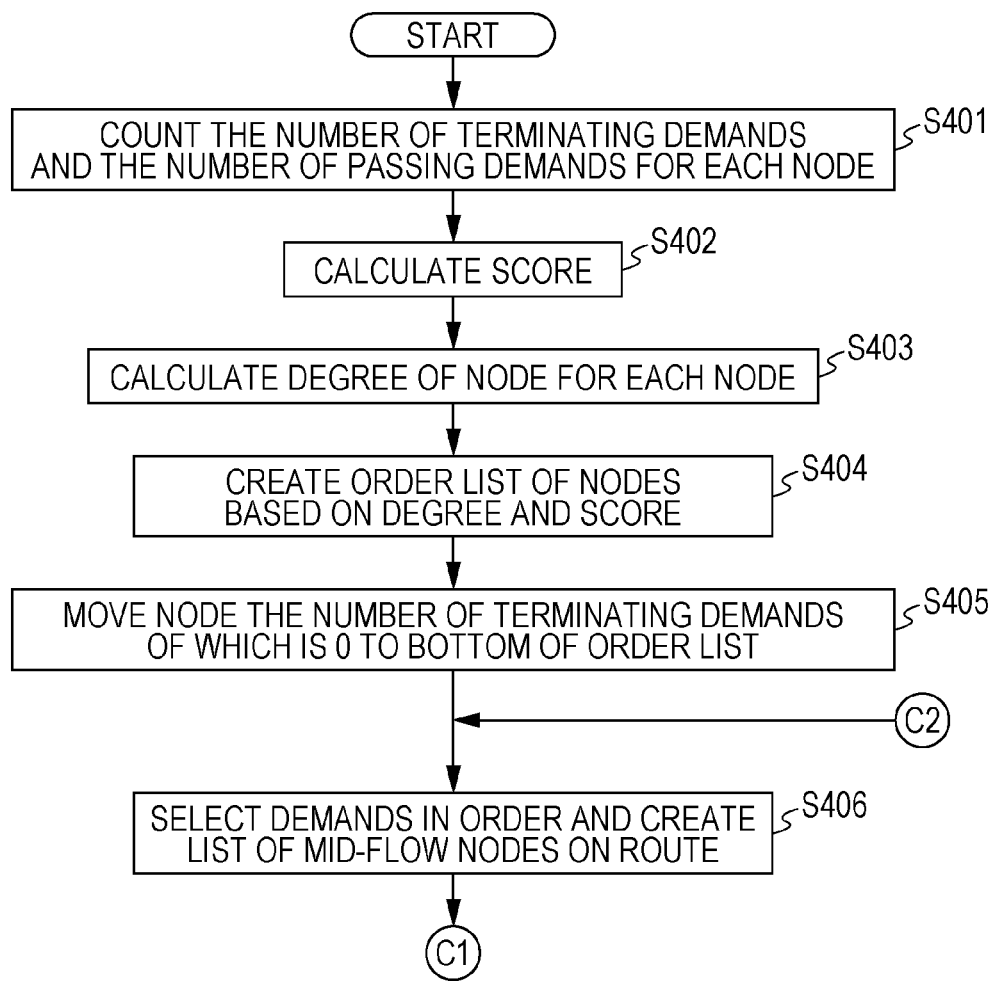
FIG. 27 illustrates an example of an operation flow for generating the combination candidates of the TDM transmission paths according to a second modified example.
Figure 28:
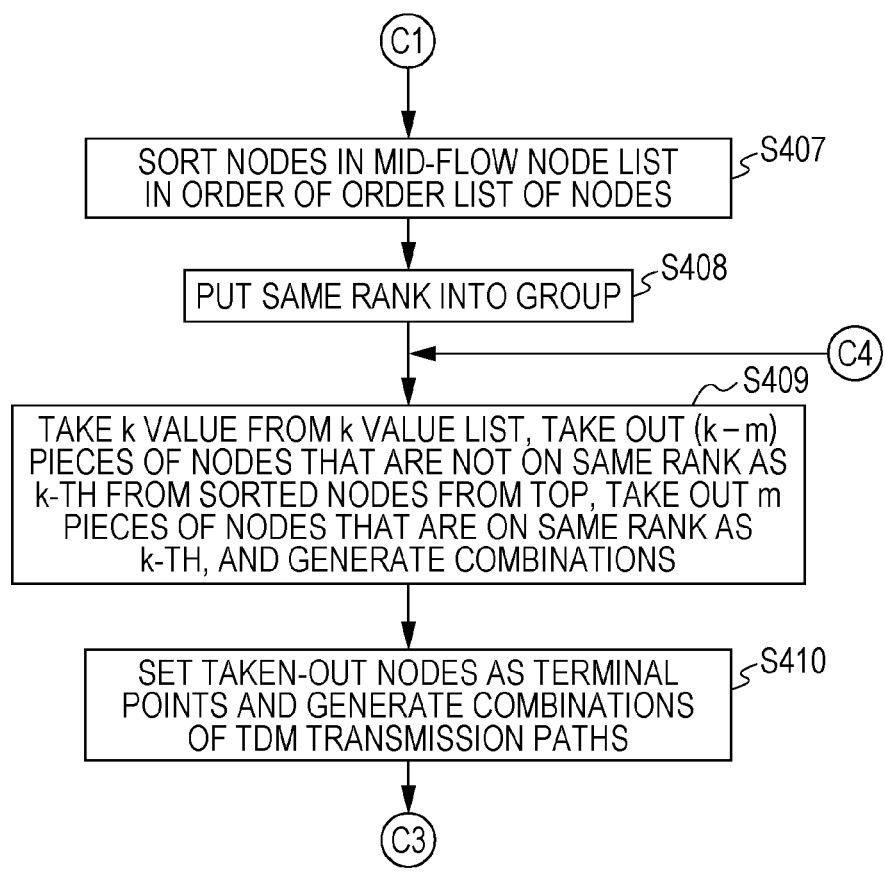
FIG. 28 illustrates an example (1) of an operation flow for generating combination candidates of the TDM transmission paths according to the second modified example.
Figure 29:
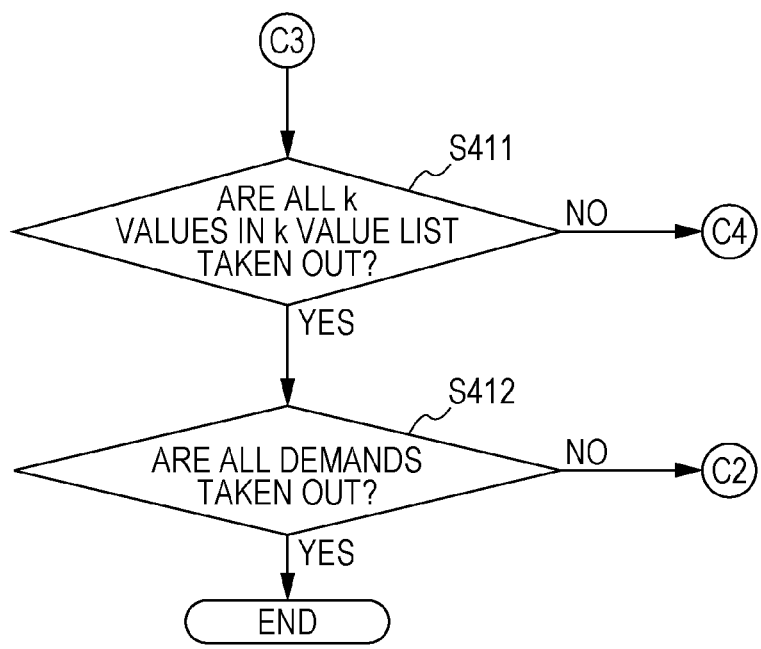
FIG. 29 illustrates an example (2) of the operation flow for generating the combination candidates of the TDM transmission paths according to the second modified example.

FIG. 27, FIG. 28, and FIG. 29 illustrate an example of an operation flow for generating the TDM transmission path combination candidates according to the second modified example. "C1" and "C2" of FIG. 27 are respectively connected to "C1" of FIG. 28 and "C2" of FIG. 29. "C3" and "C4" of FIG. 28 are respectively connected to "C3" and "C4" of FIG. 29.

The operation in step S401 to step S407 of FIG. 27 is similar to the operation in step S201 to step S207 of FIG. 12 of the above-mentioned operation example.

In step S408, the mid-flow node list generation unit 126 puts nodes having the same rank into a group. Herein, the nodes on the same rank are nodes having the same node degree and score. For example, a two-dimensional array like order[i][j] is prepared for the method for the grouping. A sequentially arranged first node and a node on the same rank as the first node are put in order[0][m]. A second node other than the node on the same rank as the sequentially arranged first node and a node on the same rank as the second node are put in order[1][n]. For example, this is represented as follows in a case where the mid-flow nodes on the route except for the starting point node and the ending point node of a certain demand are the nodes N1, N2, N3, N4, N5, N6, and N7, the order based on the node degree and score is also the order stated above, the nodes N2 and N3 are on the same rank, and the nodes N5, N6, and N7 are on the same rank.

order[0][0]=N1
order[1][0]=N2, order[1][1]=N3
order[2][0]=N4
order[3][0]=N5, order[3][1]=N6, order[3][2]=N7

With this setting, when the number of an element of an array of order[i][j] is 1 with regard to a certain number i, there is no node on the same rank as order[i][0]. When the number of the element of the array of order[i][j] is 2 or higher, it is possible to obtain a group of nodes on the same rank as order[i][0] by referring to the element of the array of order[i][j].

In step S409, the TDM transmission path combination candidate creation unit 128 takes out one value of k from the k value list with regard to the demand in process and takes out k nodes from the higher rank of the sorted mid-flow node list. The TDM transmission path combination candidate creation unit 128 checks whether or not a k-th node has a node on a same rank. For example, in the case where k=2 according to the above-mentioned example, the nodes N1 and N2 are taken out when the order is followed. It is understood that for the node N2, the node N3 exists as the node on the same rank when the two dimensional array variable order is checked. Since the number of the node on the same rank as the node N2, that is, the node included in the array of order[1][j] among the k (=2) nodes taken out is 1, the number m of the node on the same rank as the k-th node is 1. In view of the above, the TDM transmission path combination candidate creation unit 128 sequentially performs a method of taking out one node from order[1][j] and takes out the node added with (k-m) nodes from the higher rank (herein, the node N1) as k nodes. In this case, the method of taking out one from [N2 and N3] results in [N2] and [N3]. The method of taking out k (=2) nodes results in two combinations of [N1 and N2] and [N1 and N3]. For example, in the case of k=3, the node N2 exists as the node on the same rank as the node N3, but the method of taking out two from [N2 and N3] results in [N2 and N3]. Therefore, the nodes taken out in the case of k=3 are [N1, N2, and N3]. Similarly, in the case of k=4, the method results in [N1, N2, N3, and N4]. In the case of k=5, since the node N6 and the node N7 exist as the nodes on the same rank as the node N5, the nodes in the case of k=5 are three sets of [N1, N2, N3, N4, and N5], [N1, N2, N3, N4, and N6], and [N1, N2, N3, N4, and N7]. In the case of k=6, since the nodes on the same rank as the node N6 include two nodes of the node N5 and the node N6 among the nodes selected at the time of k=6, combinations obtained by selecting two from [N5, N6, and N7] exist. In this case, at the time of m=2, (k-m) nodes, that is, [N1, N2, N3, and N4] added with combinations in which two nodes are selected from among [N5, N6, and N7] are taken-out nodes. In this case, three sets of [N1, N2, N3, N4, N5, and N6], [N1, N2, N3, N4, N5, and N7], and [N1, N2, N3, N4, N6, and N7] exist.

In step S410, the TDM transmission path combination candidate creation unit 128 sets the starting point node, the ending point node, and the nodes taken out in step S409 as the terminal points to generate the combinations of the TDM transmission paths with regard to the demand in process. In a case where the nodes are not taken out in step S409, the TDM transmission path combination candidate creation unit 128 sets the TDM transmission path having the starting point node and the ending point node as the terminal points as the combination of the TDM transmission paths. In a case where the nodes in the plural combinations are taken out in step S409, the TDM transmission path combination candidate creation unit 128 generates the combinations of the TDM transmission paths with regard to all the taken-out combinations.

In step S411, the TDM transmission path combination candidate creation unit 128 checks whether or not all the values of k are taken out from the k value list to create the TDM transmission path combination candidates with regard to the demand in process. In a case where all the values of k are taken out from the k value list with regard to the demand in process (S411; YES), the processing proceeds to step S412. In a case where not all the values of k are taken out from the k value list with regard to the demand in process (S411; NO), the processing returns to step S409.

In step S412, the TDM transmission path combination candidate creation unit 128 checks whether or not all the demands are taken out and the series of processes are conducted. In a case where an unprocessed demand still exists (S412; NO), the processing returns to step S406. In a case where all the demands are taken out and the series of processes are conducted (S412; YES), the processing ends.

According to the network design apparatus 100 based on the second modified example, in a case where the nodes have the same node degree, the same number of the terminating demands, and the same number of the passing demands, it is possible to generate the TDM transmission path combination candidates in which these are appropriately combined with each other.

Third Modified Example

Next, a third modified example will be described. The third modified example has a common point with the above-mentioned operation example and the first and second modified examples. Therefore, a different point will mainly be described, and the description of the common point will be omitted.

According to the third modified example, the order list of the nodes is created from the degree and the score of the node differently from the above-mentioned operation example. According to the third modified example, in a case where plural nodes having the same degree and the same score of the node exist, the order is further determined on the basis of the number of the terminating demands. The score is a total of the number of the terminating demands and the number of the passing demands. For that reason, in the case of having the same score, as the more terminating demands exist, the fewer passing demands exist. In this case, as the node has the more terminating demands, the more TDM transmission paths having the terminal point at the node are created, and furthermore, since the number of the passing demands is low, the node is more likely to be accommodated in the TDM transmission path including the node as the terminal point together with the demands terminating at the node. For this reason, the combination of the TDM transmission paths including the TDM transmission paths provided with the node as the terminal point is generated by placing the node having the more terminating demands at a higher rank.

Figure 30:
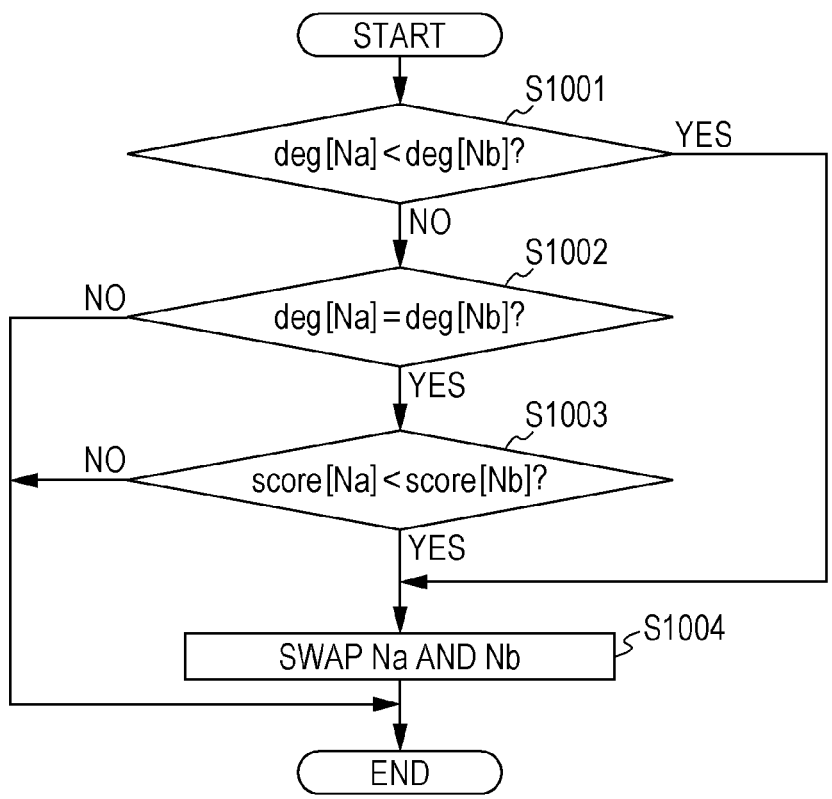
FIG. 30 illustrates an example of an operation flow for a rearrangement when an order list of the nodes is created in the above-mentioned operation example.

FIG. 30 illustrates an example of an operation flow for a rearrangement when an order list of the nodes is created according to the above-mentioned operation example. The operation flow in FIG. 30 is an operation flow for comparing conditions with regard to two nodes (a node Na and a node Nb) with each other and determining whether or not the order is swapped. In the initial stage, the node Na is a node at a higher rank than the node Nb. In addition, deg[N] denotes a degree of the node N, and score[N] denotes a score of the node N.

In step S1001, the node order list generation unit 124 compares deg[Na] with deg[Nb]. In a case where deg[Na] is lower than deg[Nb] (S1001; YES), the processing proceeds to step S1004. In a case where deg[Na] is higher than or equal to deg[Nb] (S1001; NO), the processing proceeds to step S1002.

In step S1002, the node order list generation unit 124 determines whether or not deg[Na] is equal to deg[Nb]. In a case where deg[Na] is equal to deg[Nb] (S1002; YES), the processing proceeds to step S1003. In a case where deg[Na] is not equal to deg[Nb] (S1002; NO), that is, deg[Na] is higher than deg[Nb], the node order list generation unit 124 ends the processing without swapping the order between the node Na and the node Nb.

In step S1003, the node order list generation unit 124 compares score[Na] with score[Nb]. In a case where score[Na] is lower than score[Nb] (S1003; YES), the processing proceeds to step S1004. In a case where score[Na] is higher than or equal to score[Nb] (S1003; NO), the processing ends without swapping the order between the node Na and the node Nb.

In step S1004, the node order list generation unit 124 swaps the order between the node Na and the node Nb and ends the processing.

Figure 31:
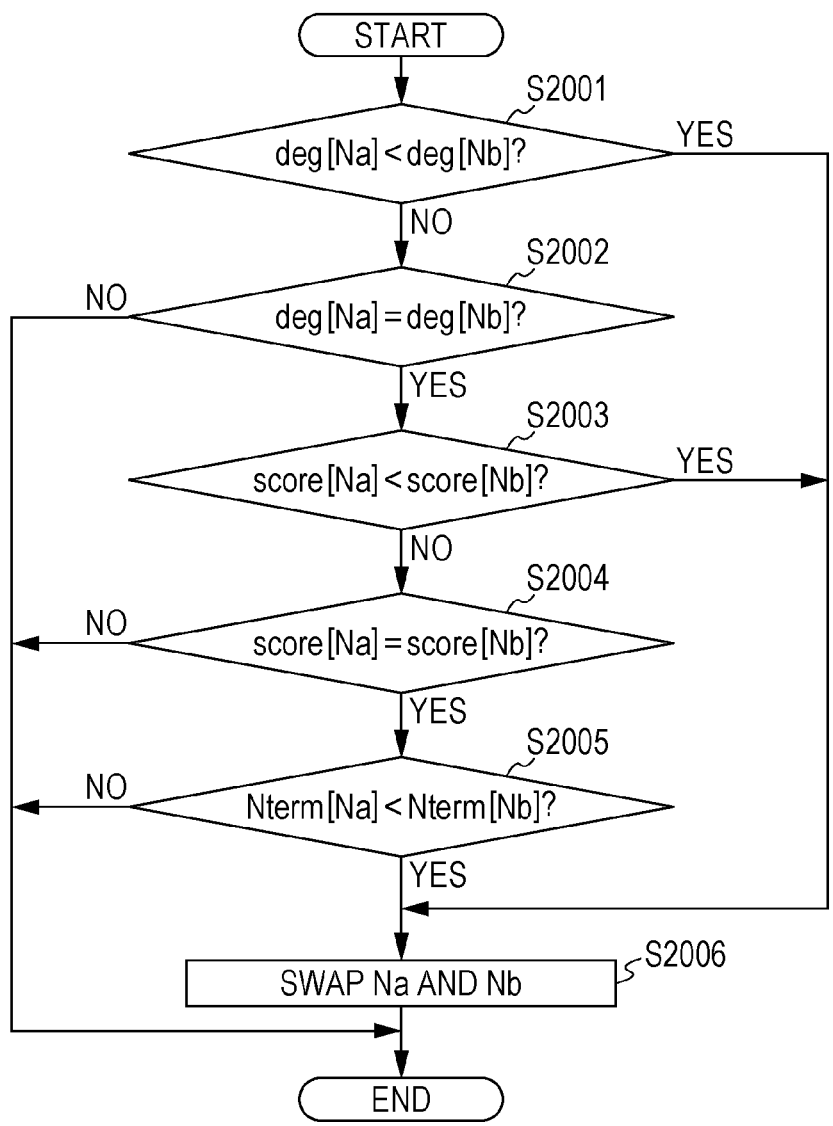
FIG. 31 illustrates an example of an operation flow for a rearrangement when an order list of the nodes is created in a third modified example.

FIG. 31 illustrates an example of an operation flow for a rearrangement when an order list of the nodes is created according to the third modified example. The operation flow in FIG. 31 is an operation flow for comparing the conditions with regard to the two nodes (the node Na and the node Nb) with each other and determining whether or not the order is swapped. In the initial stage, the node Na is a node at a higher rank than the node Nb. In addition, deg[N] denotes the degree of the node N, score[N] denotes the score of the node N, and Nterm[N] denotes the number of the demands terminating at the node N.

In step S2001, the node order list generation unit 124 compares deg[Na] with deg[Nb]. In a case where deg[Na] is lower than deg[Nb] (S2001; YES), the processing proceeds to step S2006. In a case where deg[Na] is higher than or equal to deg[Nb] (S2001; NO), the processing proceeds to step S2002.

In step S2002, the node order list generation unit 124 determines whether or not deg[Na] is equal to deg[Nb]. In a case where deg[Na] is equal to deg[Nb] (S2002; YES), the processing proceeds to step S2003. In a case where deg[Na] is not equal to deg[Nb] (S2002; NO), that is, deg[Na] is higher than deg[Nb], the node order list generation unit 124 ends the processing without swapping the order between the node Na and the node Nb.

In step S2003, the node order list generation unit 124 compares score[Na] with score[Nb]. In a case where score [Na] is lower than score[Nb](S2003; YES), the processing proceeds to step S2006. In a case where score[Na] is higher than or equal to score[Nb] (S2003; NO), the processing proceeds to step S2004.

In step S2004, the node order list generation unit 124 determines whether or not score[Na] is equal to score[Nb]. In a case where score[Na] is equal to score[Nb] (S2004; YES), the processing proceeds to step S2005. In a case where score [Na] is not equal to score[Nb] (S2004; NO), that is, in a case where score [Na] is higher than score[Nb], the node order list generation unit 124 ends the processing without swapping the order between the node Na and the node Nb.

In step S2005, the node order list generation unit 124 compares Nterm[Na] with Nterm[Nb]. In a case where Nterm [Na] is lower than Nterm[Nb] (S2005; YES), the processing proceeds to step S2006. In a case where Nterm[Na] is higher than or equal to Nterm[Nb] (S2005; NO), the processing ends without swapping the order between the node Na and the node Nb.

In step S2006, the node order list generation unit 124 swaps the order between the node Na and the node Nb and ends the processing.

According to the network design apparatus 100 based on the third modified example, it is possible to select the more appropriate combination candidate by prioritizing the node having the higher number of the terminating demands among the nodes having the same node degree and the same total of the number of the terminating demands and the number of the passing demands.

Fourth Modified Example

Next, a fourth modified example will be described. The fourth modified example has a common point with the above-mentioned operation example, the first to third modified examples. Therefore, a different point will mainly be described, and the description of the common point will be omitted.

According to the fourth modified example, the order list of the nodes is created from the degree and the score of the node differently from the above-mentioned operation example. According to the fourth modified example, in the case of the same degree and score of the node and the same number of the demands terminating at the node, the order is further determined on the basis of the number of the combinations of the starting point nodes and the ending point nodes of the passing demands. In a certain case, when all the passing demands have the same starting point node and the same ending point node, the TDM transmission path is set to accommodate the demands between the starting point node and the ending point node of the passing demand to increase the probability that the optimal solution is obtained. In this case, the rank is lowered since there is not much point in generating the TDM transmission path including the node as the terminal point. For example, in a case where four demands between the nodes N1 and N5, eight demands between the nodes N2 and N6, and four demands between the nodes N1 and N6 exist as the demands passing through a certain node, the number of pairs of the starting point node and the ending point node is counted as three including the nodes N1 and N5, the nodes N2 and N6, and the nodes N1 and N6. If the number of the passing demands is the same, as the number of pairs of the starting point node and the ending point node is higher, an average value of the number of the demands having both the same starting point node and the same ending point node is lower, and a probability that the TDM transmission path is set for the accommodation between the starting point node and the ending point node of the demand is decreased.

Figure 32:
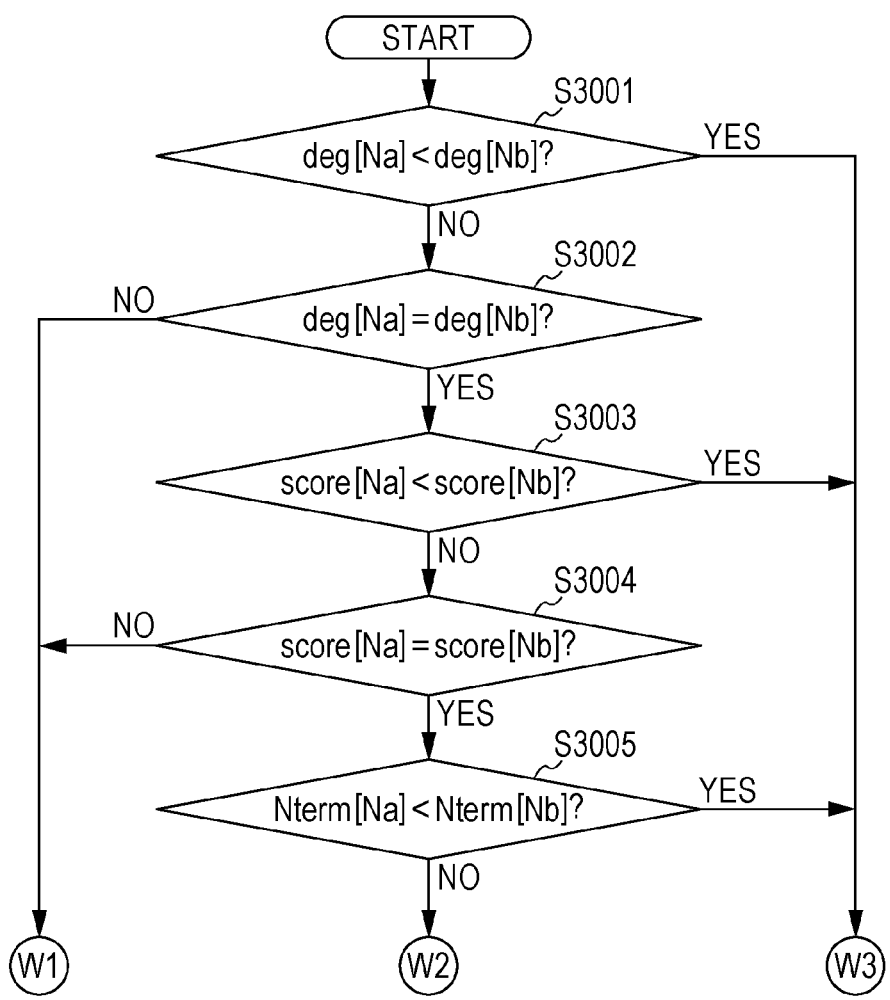
FIG. 32 illustrates an example (1) of an operation flow for a rearrangement when an order list of the nodes is created in a fourth modified example.
Figure 33:
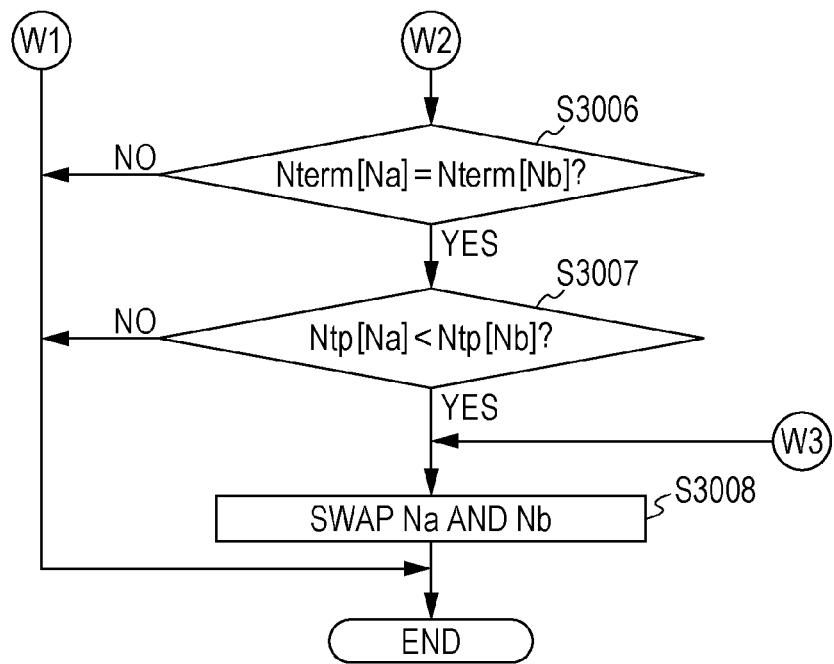
FIG. 33 illustrates an example (2) of the operation flow for the rearrangement when the order list of the nodes is created in the fourth modified example.

FIG. 32 and FIG. 33 illustrate an example of an operation flow for a rearrangement when an order list of the nodes is created according to the fourth modified example. "W1", "W2", and "W3" of FIG. 32 are respectively connected to "W1", "W2", and "W3" of FIG. 33. The operation flow in FIG. 32 and FIG. 33 is an operation flow for comparing the conditions with regard to the two nodes (the node Na and the node Nb) with each other and determining whether or not the order is swapped. In the initial stage, the node Na is a node at a higher rank than the node Nb. In addition, deg[N] denotes the degree of the node N, score[N] denotes the score of the node N, Nterm[N] denotes the number of the demands terminating at the node N, and Ntp[N] denotes the number of pairs of the starting point node and the ending point node of the demand passing through the node N.

The operation in step S3001 to step S3004 of FIG. 32 is similar to the operation in step S2001 to step S2004 of FIG. 31 according to the above-mentioned third modified example.

In step S3005, the node order list generation unit 124 compares Nterm[Na] with Nterm[Nb]. In a case where Nterm [Na] is lower than Nterm [Nb] (S3005; YES), the processing proceeds to step S3008. In a case where Nterm [Na] is higher than or equal to Nterm [Nb] (S3005; NO), the processing proceeds to step S3006.

In step S3006, the node order list generation unit 124 determines whether or not Nterm[Na] is equal to Nterm[Nb]. In a case where Nterm[Na] is equal to Nterm[Nb] (S3006; YES), the processing proceeds to step S3007. In a case where Nterm[Na] is not equal to Nterm[Nb] (S3006; NO), that is, in a case where Nterm[Na] is higher than Nterm[Nb], the node order list generation unit 124 ends the processing without swapping the order between the node Na and the node Nb.

In step S3007, the node order list generation unit 124 compares Ntp[Na] with Ntp[Nb]. In a case where Ntp[Na] is lower than Ntp[Nb] (S3007; YES), the processing proceeds to step S3008. In a case where Ntp[Na] is higher than or equal to Ntp[Nb] (S3007; NO), the processing ends without swapping the order between the node Na and the node Nb.

In step S3008, the node order list generation unit 124 swaps the order between the node Na and the node Nb and ends the processing.

According to the network design apparatus 100 based on the fourth modified example, it is possible to select the more appropriate combination candidate by prioritizing the node having the higher number of pairs of the starting point nodes and the ending point nodes among the nodes having the same node degree and the same total of the number of the terminating demands and the number of the passing demands.

Fifth Modified Example

Next, a fifth modified example will be described. The fifth modified example has a common point with the above-mentioned operation example and the first to fourth modified examples. Therefore, a different point will mainly be described, and the description of the common point will be omitted.

According to the fifth modified example, the order list of the nodes is created from the degree and the score of the node differently from the above-mentioned operation example. According to the fifth modified example, in the case of the same degree and score of the node and the same number of the demands terminating at the node, the order is further determined on the basis of a highest value of the number of demands having the same starting point node and the same ending point node among the passing demands. The fifth modified example has a similar concept to the fourth modified example, and the order of the node is set lower as the number of the demands having the same starting point node and the same ending point node among the passing demands is higher.

Figure 34:
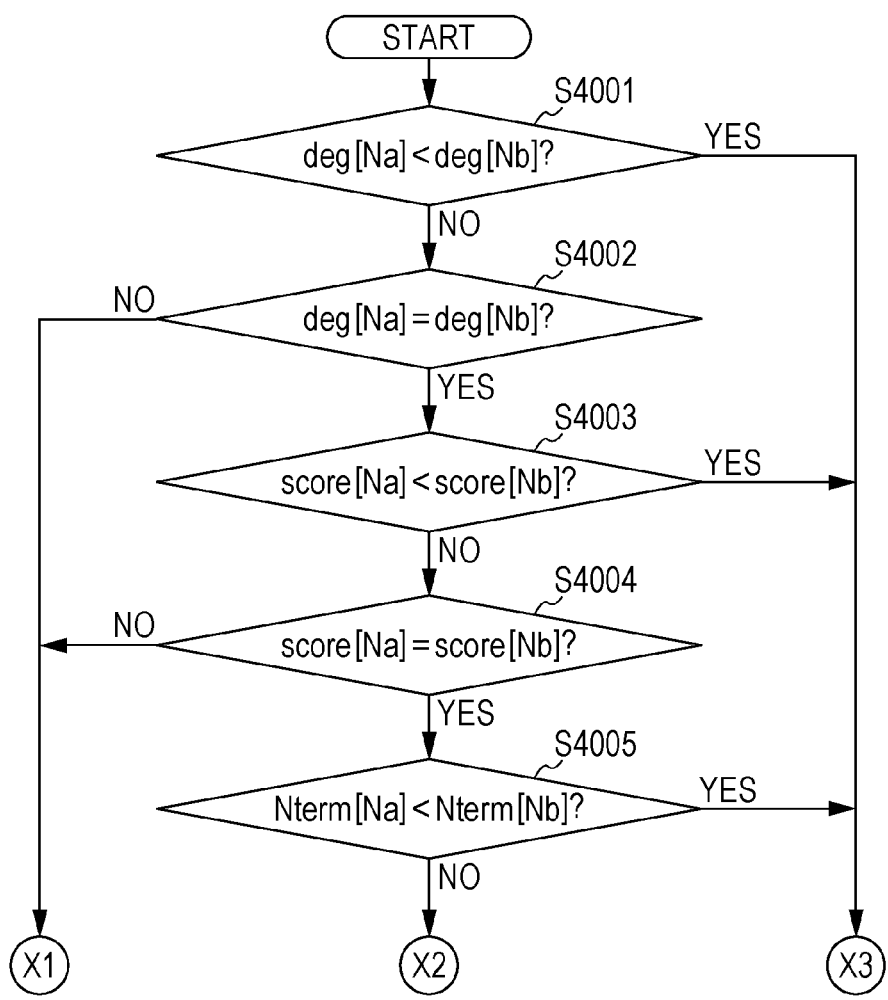
FIG. 34 illustrates an example (1) of an operation flow for a rearrangement when an order list of the nodes is created in a fifth modified example.
Figure 35:
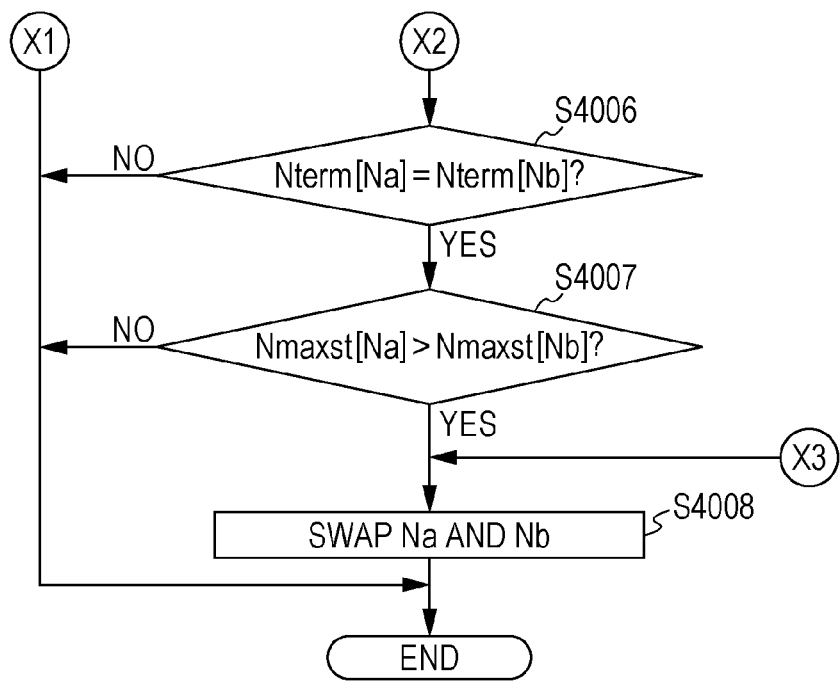
FIG. 35 illustrates an example (2) of the operation flow for the rearrangement when the order list of the nodes is created in the fifth modified example.

FIG. 34 and FIG. 35 illustrate an example of an operation flow for a rearrangement when an order list of the nodes is created according to the fifth modified example. "X1", "X2", and "X3" of FIG. 34 are respectively connected to "X1", "X2", and "X3" of FIG. 35. The operation flow in FIG. 34 and FIG. 35 is an operation flow for comparing the conditions with regard to the two nodes (the node Na and the node Nb) with each other and determining whether or not the order is swapped. In the initial stage, the node Na is a node at a higher rank than the node Nb. In addition, deg[N] denotes the degree of the node N, score[N] denotes the score of the node N, Nterm[N] denotes the number of the demands terminating at the node N, Nmaxst[N] denotes a highest value of the number of the demands having both the same starting point node and the same ending point node with regard to the demands passing through the node N. For example, in a case where four demands between the nodes N1 and N5, eight demands between the nodes N2 and N6, and four demands between the nodes N1 and N6 exist as the demands passing through the node N, since the demand between the nodes N2 and N6 has the highest number of the demands having the same starting point node and the same ending point node, Nmaxst[N] is 8.

The operation in step S4001 to step S4006 of FIG. 34 and FIG. 35 is similar to the operation in step S3001 to step S3006 of FIG. 32 and FIG. 33 according to the above-mentioned fourth modified example.

In step S4007, the node order list generation unit 124 compares Nmaxst[Na] with Nmaxst[Nb]. In a case where Nmaxst[Na] is higher than Nmaxst[Nb] (S4007; YES), the processing proceeds to step S4008. In a case where Nmaxst[Na] is lower than or equal to Nmaxst[Nb] (S4007; NO), the processing ends without swapping the order between the node Na and the node Nb.

In step S4008, the node order list generation unit 124 swaps the order between the node Na and the node Nb and ends the processing.

According to the network design apparatus 100 based on the fifth modified example, it is possible to select the more appropriate combination candidate of the TDM transmission paths by prioritizing the node having the fewer number of the demands having the matched starting point node and the matched ending point node of the passing demand among the nodes having the same degree and the same score of the node.

Sixth Modified Example

Next, a sixth modified example will be described. The sixth modified example has a common point with the above-mentioned operation example and the first to fifth modified examples. Therefore, a different point will mainly be described, and the description of the common point will be omitted.

According to the sixth modified example, the order list of the nodes is created from the degree and the score of the node differently from the above-mentioned operation example. According to the sixth modified example, in the case of the same degree and score of the node and the same number of the demands terminating at the node, the order is further determined on the basis of an average value of the number of the demands having the same starting point node and the same ending point node among the passing demands. The sixth modified example has a similar concept to the fourth and fifth modified examples, and the order of the node is set lower as the number of the demands having the same starting point node and the same ending point node among the passing demands is higher.

Figure 36:
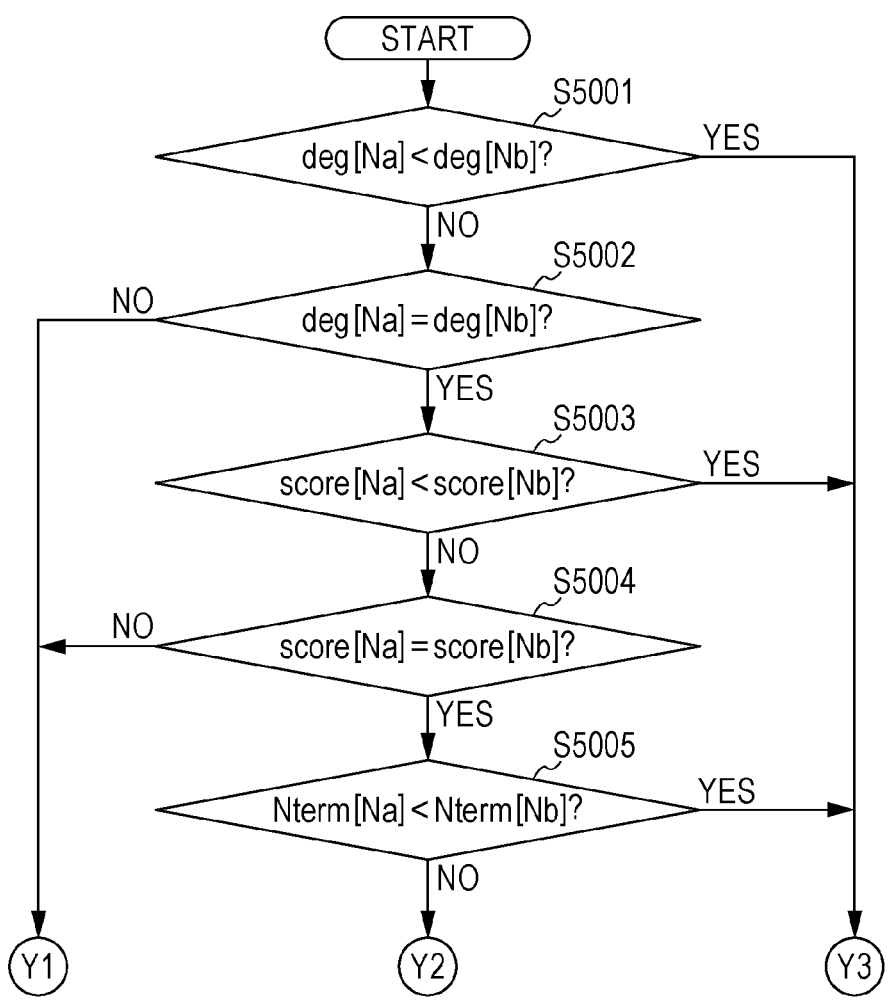
FIG. 36 illustrates an example (1) of an operation flow for a rearrangement when an order list of the nodes is created in a sixth modified example.
Figure 37:
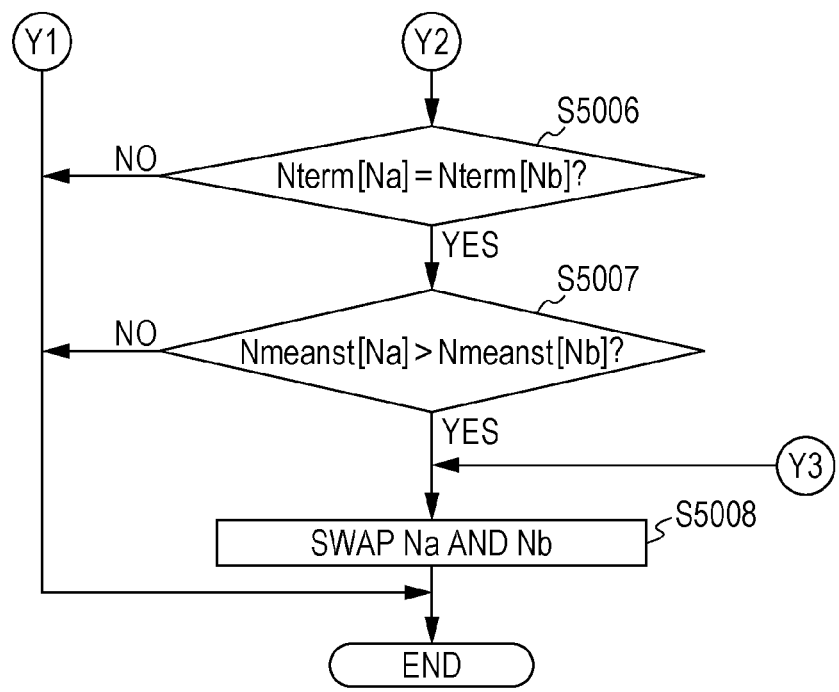
FIG. 37 illustrates an example (2) of the operation flow for the rearrangement when the order list of the nodes is created in the sixth modified example.

FIG. 36 and FIG. 37 illustrate an example of an operation flow for a rearrangement when an order list of the nodes is created according to the sixth modified example. "Y1", "Y2", and "Y3" of FIG. 36 are respectively connected to "Y1", "Y2", and "Y3" of FIG. 37. The operation flow in FIG. 36 and FIG. 37 is an operation flow for comparing the conditions with regard to the two nodes (the node Na and the node Nb) with each other and determining whether or not the order is swapped. In the initial stage, the node Na is a node at a higher rank than the node Nb. In addition, deg[N] denotes the degree of the node N, score[N] denotes the score of the node N, Nterm[N] denotes the number of the demands terminating at the node N, and Nmeanst[N] denotes an average value of the number of the demands having the same starting point node and the same ending point node with regard to the demands passing through the node N. For example, in a case where four demands between the nodes N1 and N5, eight demands between the nodes N2 and N6, and four demands between the nodes N1 and N6 exist as the demands passing through the node N, since the average value of the number of the demands having the same starting point node and the same ending point node is 5.3, Nmaxst[N] is 5.3.

The operation in step S5001 to step S5006 of FIG. 36 and FIG. 37 is similar to the operation in step S3001 to step S3006 of FIG. 32 and FIG. 33 according to the above-mentioned fourth modified example.

In step S5007, the node order list generation unit 124 compares Nmeanst[Na] with Nmeanst[Nb]. In a case where Nmeanst[Na] is higher than Nmeanst[Nb] (S5007; YES), the processing proceeds to step S4008. In a case where Nmeanst[Na] is lower than or equal to Nmeanst[Nb] (S5007; NO), the processing ends without swapping the order between the node Na and the node Nb.

In step S5008, the node order list generation unit 124 swaps the order between the node Na and the node Nb and ends the processing.

According to the network design apparatus 100 based on the sixth modified example, it is possible to select the appropriate combination candidate by prioritizing the node having a low average value of the number of the demands having the matched starting point node and the matched ending point node of the passing demand among the nodes having the same degree and the same score of the node.

Seventh Modified Example

Next, a seventh modified example will be described. The seventh modified example has a common point with the above-mentioned operation example and the first to sixth modified examples. Therefore, a different point will mainly be described, and the description of the common point will be omitted.

According to the seventh modified example, the order list of the nodes is created from the degree and the score of the node differently from the above-mentioned operation example. According to the seventh modified example, in the case of the same degree and score of the node and the same number of the demands terminating at the node, the order is further determined on the basis of a ratio of the total value of the demands having the same starting point node and the same ending point node among the passing demands to the total value of the passing demands. The seventh modified example has a similar concept to the fourth to sixth modified examples, and the order of the node is set lower as the number of the demands having the same starting point node and the same ending point node among the passing demands is higher.

Figure 38:
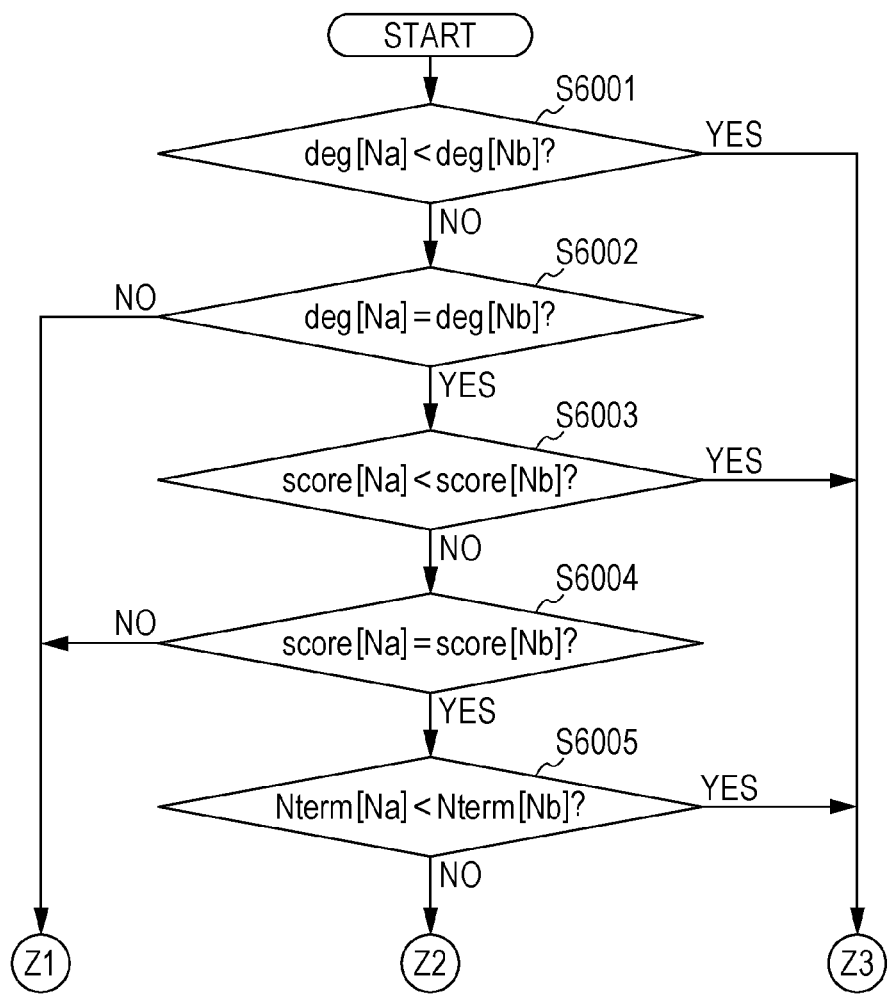
FIG. 38 illustrates an example (1) of an operation flow for a rearrangement when an order list of the nodes is created in a seventh modified example.
Figure 39:
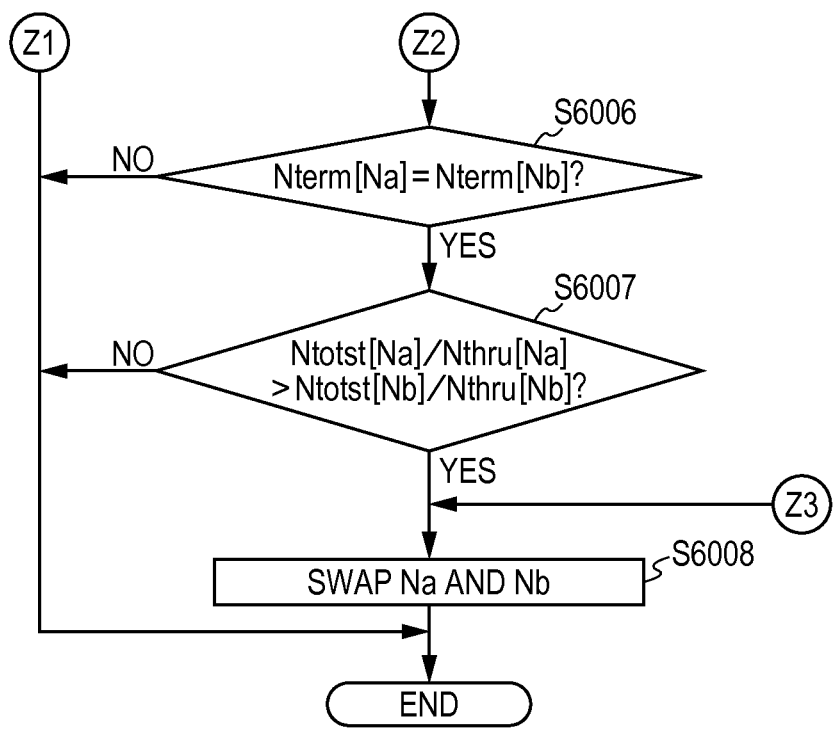
FIG. 39 illustrates an example (2) of the operation flow for the rearrangement when the order list of the nodes is created in the seventh modified example.

FIG. 38 and FIG. 39 illustrate an example of an operation flow for a rearrangement when an order list of the nodes is created according to the seventh modified example. "Z1", "Z2", and "Z3" of FIG. 38 are respectively connected to "Z1", "Z2", and "Z3" of FIG. 39. The operation flow in FIG. 38 and FIG. 39 is an operation flow for comparing the conditions with regard to the two nodes (the node Na and the node Nb) with each other and determining whether or not the order is swapped. In the initial stage, the node Na is a node at a higher rank than the node Nb. In addition, deg[N] denotes the degree of the node N, score[N] denotes the score of the node N, and Nterm[N] denotes the number of the demands terminating at the node N. Ntotst[N] denotes a total value of the demands having the same starting point node and the same ending point node with regard to the demands passing through the node N. For example, in a case where one demand between the nodes N1 and N4, four demands between the nodes N1 and N5, one demand between the nodes N2 and N6, and two demands between the nodes N1 and N6 exist as the demands passing through the node N, since the total value of the demands having the same starting point node and the same ending point node is 6, Ntotst[N] is 6. In addition, Nthru[N] denotes a total value of the demands passing through the node N. Nthru[N] is 8 in the above-mentioned example. A ratio of Ntotst[N] to Nthru[N] is represented as Ntotst[N]/Nthru[N], and 6/8=0.75 is obtained in the above-mentioned example.

The operation in step S6001 to step S6006 of FIG. 38 and FIG. 39 is similar to the operation in step S3001 to step S3006 of FIG. 32 and FIG. 33 according to the above-mentioned fourth modified example.

In step S6007, the node order list generation unit 124 compares Ntotst[Na]/Nthru[Na] with Ntotst[Nb]/Nthru[Nb]. In a case where Ntotst[Na]/Nthru[Na] is higher than Ntotst[Nb]/Nthru[Nb] (S6007; YES), the processing proceeds to step S6008. In a case where Ntotst[Na]/Nthru[Na] is lower than or equal to Ntotst[Nb]/Nthru[Nb] (S6007; NO), the processing ends without swapping the order between the node Na and the node Nb.

In step S6008, the node order list generation unit 124 swaps the order between the node Na and the node Nb and ends the processing.

According to the network design apparatus 100 based on the seventh modified example, it is possible to select the more appropriate combination candidate of the TDM transmission paths by prioritizing the node having the higher predetermined ratio among the nodes having the same degree and the same score of the node.

Eighth Modified Example

Next, an eighth modified example will be described. The eighth modified example has a common point with the above-mentioned operation example and the first to seventh modified examples. Therefore, a different point will mainly be described, and the description of the common point will be omitted.

According to the above-mentioned operation example, the degree and the score of the node are calculated with regard to all the nodes in the network at the beginning. According to the eighth modified example, the degree and the score of the node are calculated for each demand with regard to the mid-flow nodes on the route except for the starting point node and the ending point node. In a case where the demand passes through only a part of the nodes in the network, if the degree and the score are calculated with regard to all the nodes, calculation resource is wastefully used. For this reason, according to the eighth modified example, the calculation is not conducted with regard to the nodes through which the demands do not pass. It is also efficient to calculate the degree and the score with regard to all the nodes at the beginning in a case where the demands exist across the entire network and the number of the demands is high as in the above-mentioned operation example. That is, the eighth modified example is effective in a case where the number of the demands is low in contrast to a size of the network.

Figure 40:
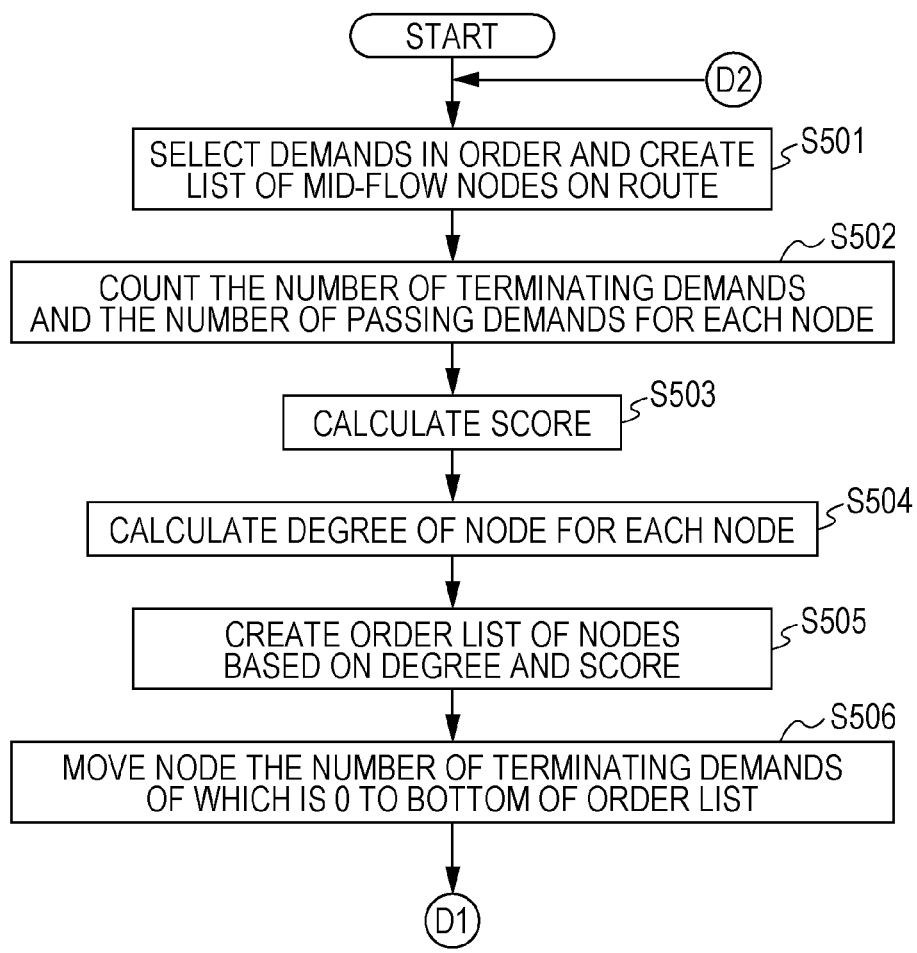
FIG. 40 illustrates an example (1) of an operation flow for generating combination candidates of the TDM transmission paths according to an eighth modified example.
Figure 41:
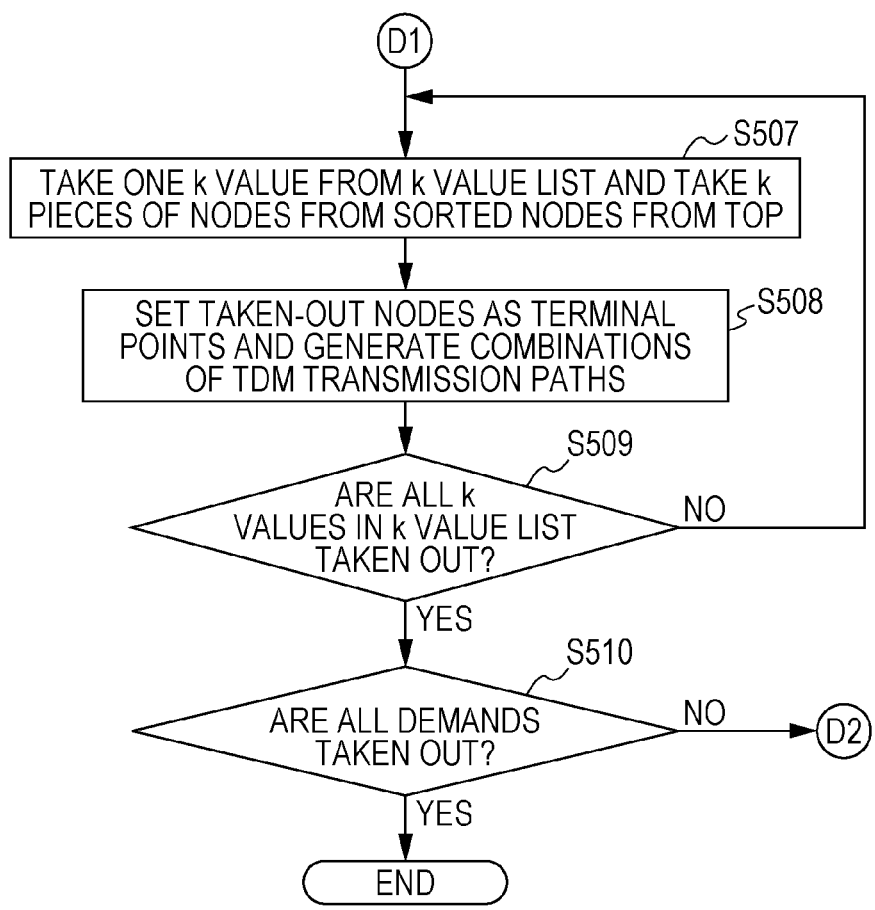
FIG. 41 illustrates an example (2) of the operation flow for generating the combination candidates of the TDM transmission paths according to the eighth modified example.

FIG. 40 and FIG. 41 illustrate an example of an operation flow for generating combination candidates of the TDM transmission paths according to the eighth modified example. "D1" and "D2" of FIG. 40 are respectively connected to "D1" and "D2" of FIG. 41.

In step S501, the mid-flow node list generation unit 126 generates the mid-flow node list for each demand. The mid-flow node list generation unit 126 takes out one demand from the demand information (which is set as demand in process) and takes out the mid-flow nodes on the route of the demand. The mid-flow nodes on the route of the demand are node through which the demand passes. For example, the mid-flow node list generation unit 126 takes out the node N2, the node N3, the node N4, and the node N5 corresponding to the mid-flow nodes on the route of the demand with respect to the demand between the nodes N1 and N6. The mid-flow node list generation unit 126 stores the taken-out nodes in the memory 140 as the mid-flow node list. The mid-flow node list is generated for each demand.

In step S502, the node degree score calculation unit 122 counts the number of the terminating demands and the number of the passing demands for each node with respect to the nodes included in the mid-flow node list generated in step S501. The node degree score calculation unit 122 extracts the nodes included in the mid-flow node list and the demands included in the demand information from the memory 140. The node degree score calculation unit 122 counts the number of the demands terminating at the node and the number of the demands passing through the node with regard to the respective nodes included in the mid-flow node list. The number of the terminating demands may be a sum of the number of the demands where the node is included in the starting point node or the ending point node of the demands included in FIG. 11 with regard to the respective nodes included in the mid-flow node list.

The operation in step S503 to step S506 is similar to the operation in step S202 to step S205 of FIG. 12.

The operation in step S507 to step S510 is also similar to the operation in step S208 to step S211 of FIG. 13. It is however noted that in step S510, in a case where an unprocessed demand still exists (S510; NO), the processing returns to step S501.

According to the network design apparatus 100 based on the eighth modified example, it is possible to select the more appropriate and fewer combination candidates of the TDM transmission paths by obtaining the degree and the score of the node with regard to the mid-flow nodes on the route except for the starting point nodes and the ending point nodes of the respective demands.

Ninth Modified Example

Next, a ninth modified example will be described. The ninth modified example has a common point with the above-mentioned operation example and the first to eighth modified example. Therefore, a different point will mainly be described, and the description of the common point will be omitted.

According to the above-mentioned operation example, the degree and the score of the node are calculated with regard to all the nodes in the network at the beginning. According to the ninth modified example, nodes where at least one passing demand exists are selected, and the degree and the score of the node are calculated with regard to those nodes to create the order list of the nodes based on the degree and the score. For example, since the demand passing through the node the degree of which is 1 like the node N1, the node N6, the node N7, and the node N8 of FIG. 10 does not exist, these nodes are not the mid-flow nodes on the route. Therefore, the score or the like may not be calculated with regard to these nodes. According to the ninth modified example, the score is not calculated with regard to these nodes.

Figure 42:
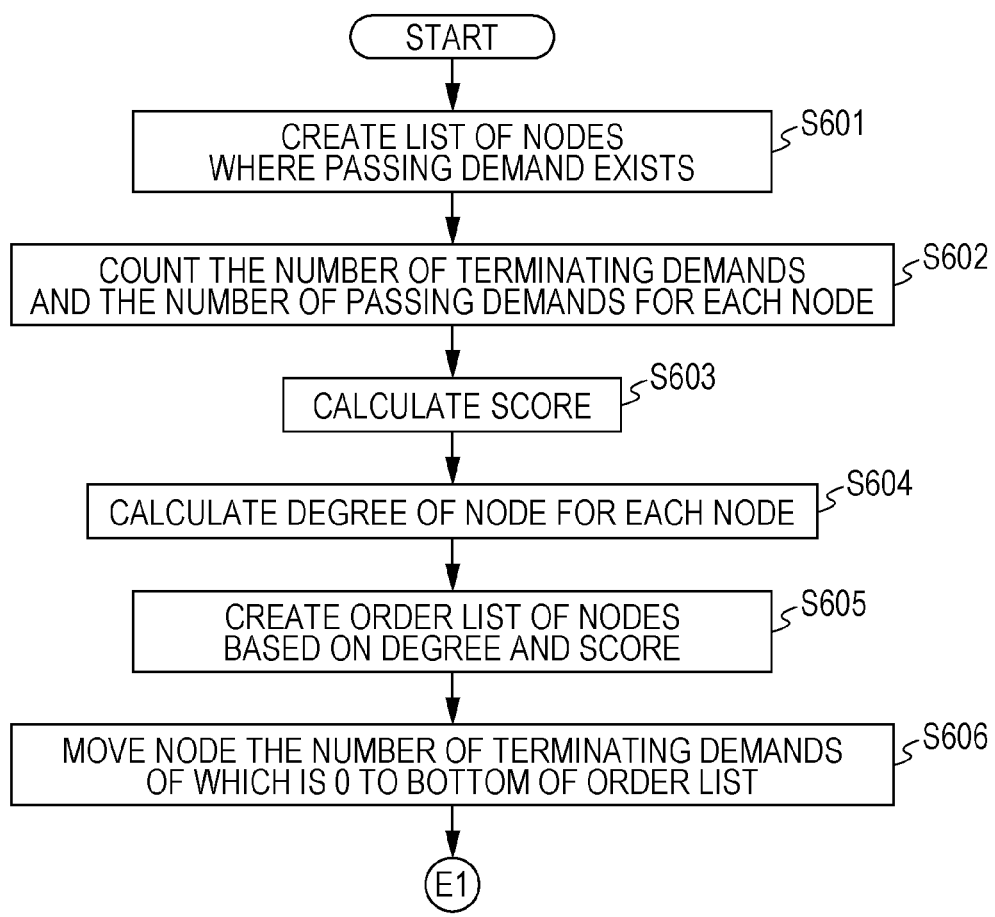
FIG. 42 illustrates an example (1) of an operation flow for generating combination candidates of the TDM transmission paths according to a ninth modified example.
Figure 43:
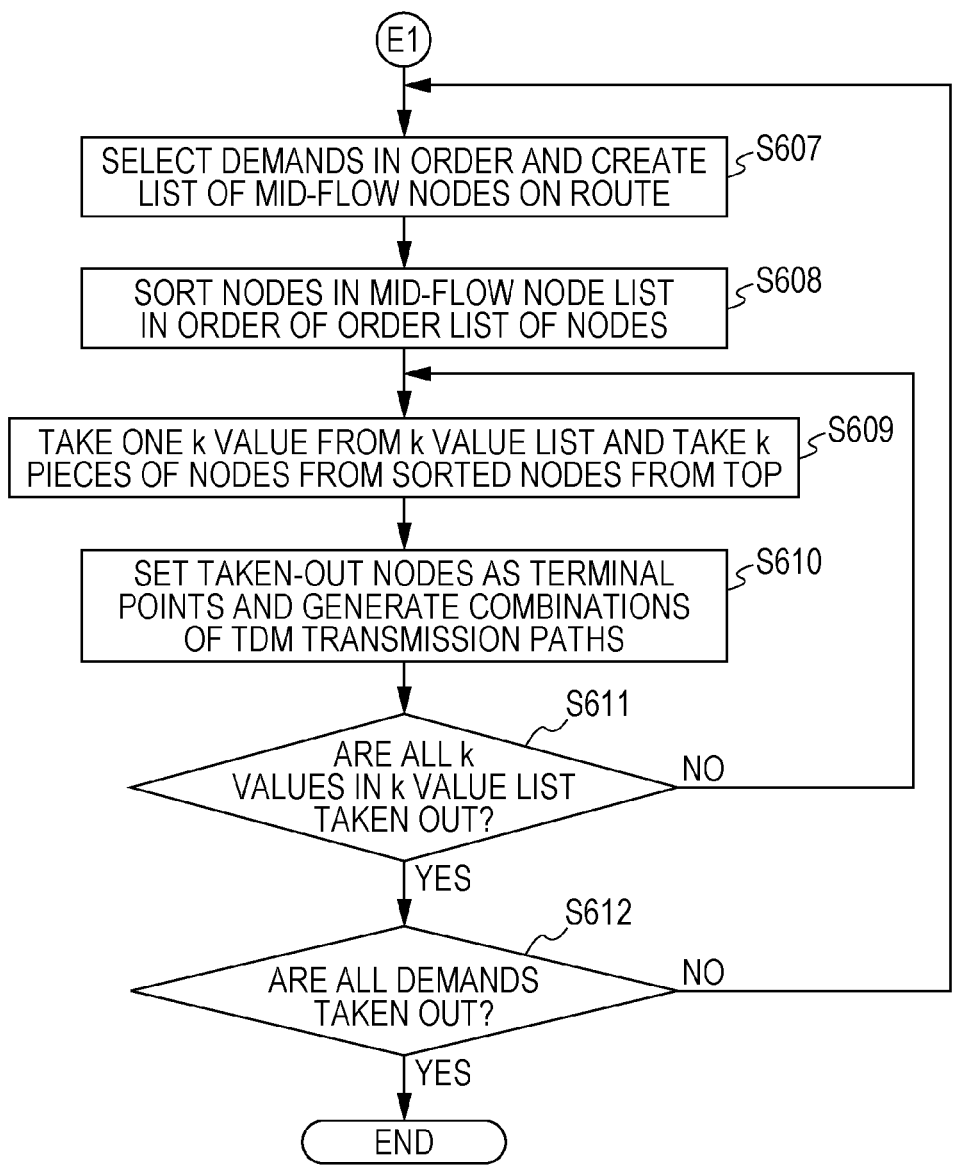
FIG. 43 illustrates an example (2) of the operation flow for generating the combination candidates of the TDM transmission paths according to the ninth modified example.

FIG. 42 and FIG. 43 illustrate an example of an operation flow for generating combination candidates of the TDM transmission paths according to the ninth modified example. "E1" of FIG. 42 is connected to "E1" of FIG. 43.

In step S601, the node degree score calculation unit 122 extracts the nodes where at least one passing demand exists by referring to the demand information with regard to the nodes included in the node information and creates a list of the nodes where at least one passing demand exists.

In step S602, the node degree score calculation unit 122 counts the number of the terminating demands and the number of the passing demands for each node with respect to the nodes included in the list created in step S601. The node degree score calculation unit 122 extracts the nodes included in the list created in step S601 and the demands included in the demand information from the memory 140. The node degree score calculation unit 122 counts the number of the demands terminating at the node and the number of the demands passing through the node with regard to the respective nodes included in the list created in step S601. The number of the terminating demands may be calculated by obtaining a sum of the number of the demands where the node is included in the starting point node or the ending point node of the demands included in FIG. 11 with regard to the respective nodes included in the list created in step S601.

The operation in step S603 to step S612 is similar to the operation in step S202 of FIG. 12 to step S211 of FIG. 13.

According to the network design apparatus 100 based on the ninth modified example, it is possible to select the more appropriate and still fewer combination candidates of the TDM transmission paths by obtaining the degree and the score of the node with regard to a certain node having a passing demand.

Tenth Modified Example

Next, a tenth modified example will be described. The tenth modified example has a common point with the above-mentioned operation example and the first to ninth modified examples. Therefore, a different point will mainly be described, and the description of the common point will be omitted.

According to the above-mentioned operation example, the degree and the score of the node are calculated with regard to all the nodes in the network at the beginning. According to the tenth modified example, the node where at least one passing demand exists and also at least one terminating demand exists is selected, and the degree and the score of the node are calculated with regard to the selected node to create the order list of the nodes based on the degree and the score. According to the ninth modified example, the node the number of the terminating demand is 0 is moved to the bottom of the order list. In contrast, according to the tenth modified example, the order list does not include the node the number of the terminating demand is 0. With this difference, the node having no terminating demand is not selected as the terminal point of the TDM transmission path according to the tenth modified example.

Figure 44:
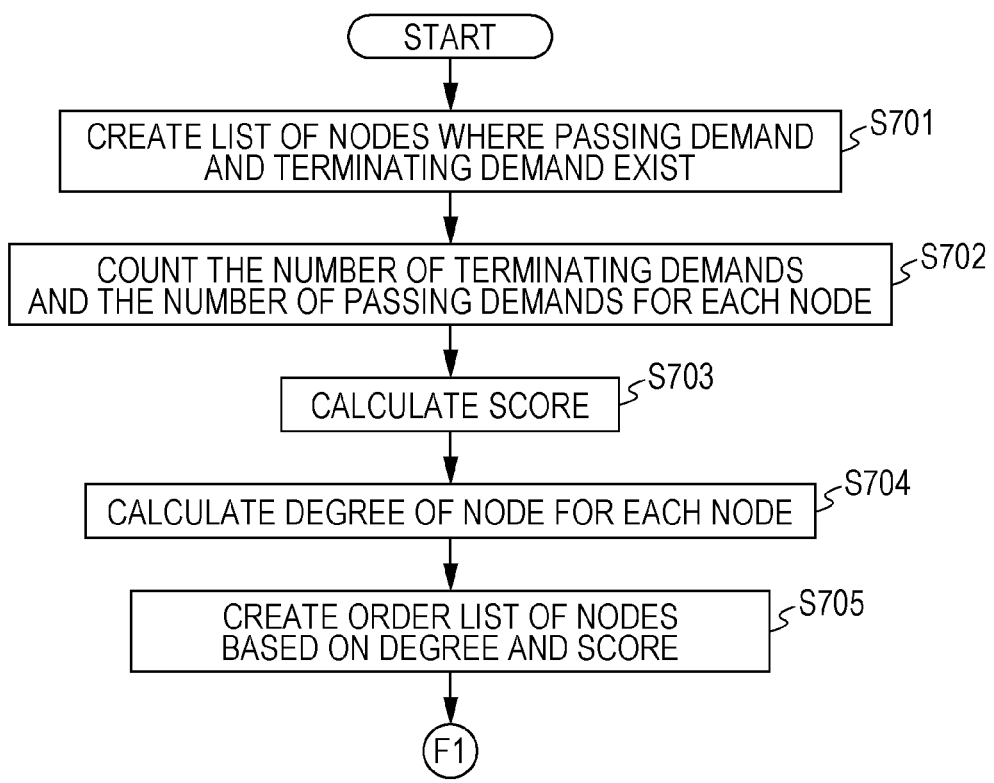
FIG. 44 illustrates an example (1) of an operation flow for generating combination candidates of the TDM transmission paths according to a tenth modified example.
Figure 45:
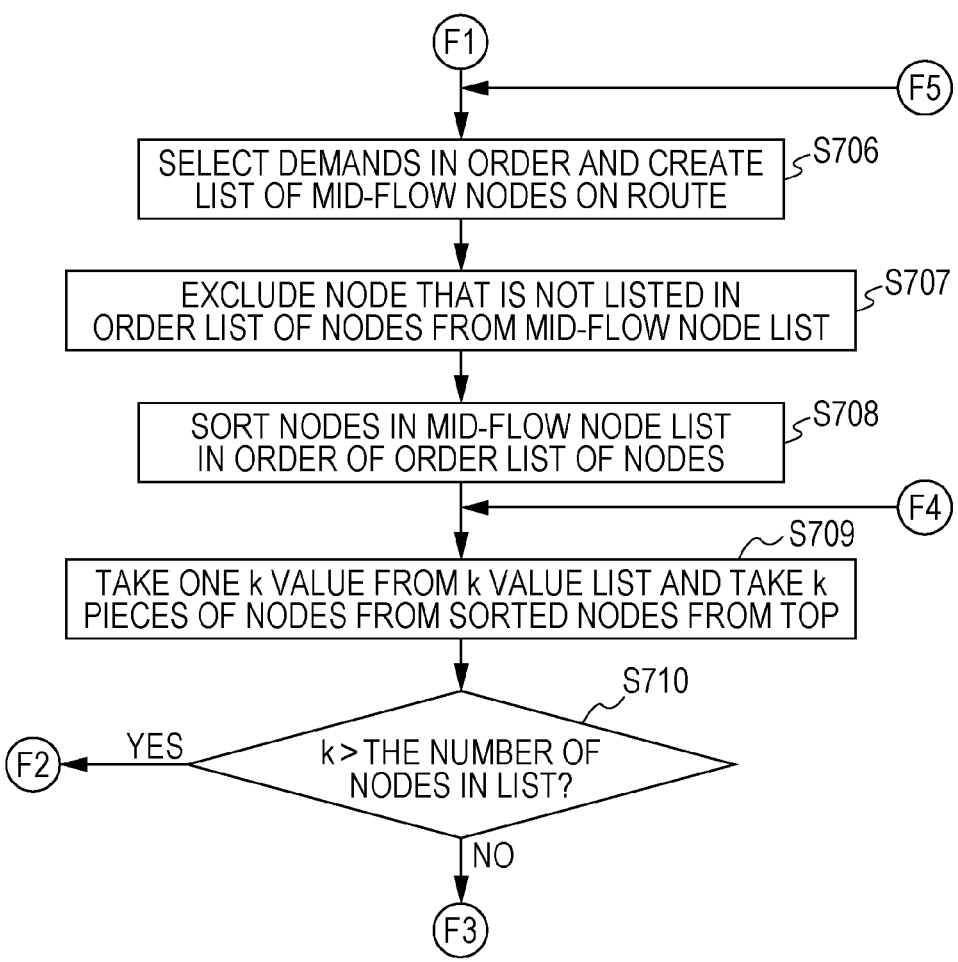
FIG. 45 illustrates an example (2) of the operation flow for generating the combination candidates of the TDM transmission paths according to the tenth modified example.
Figure 46:
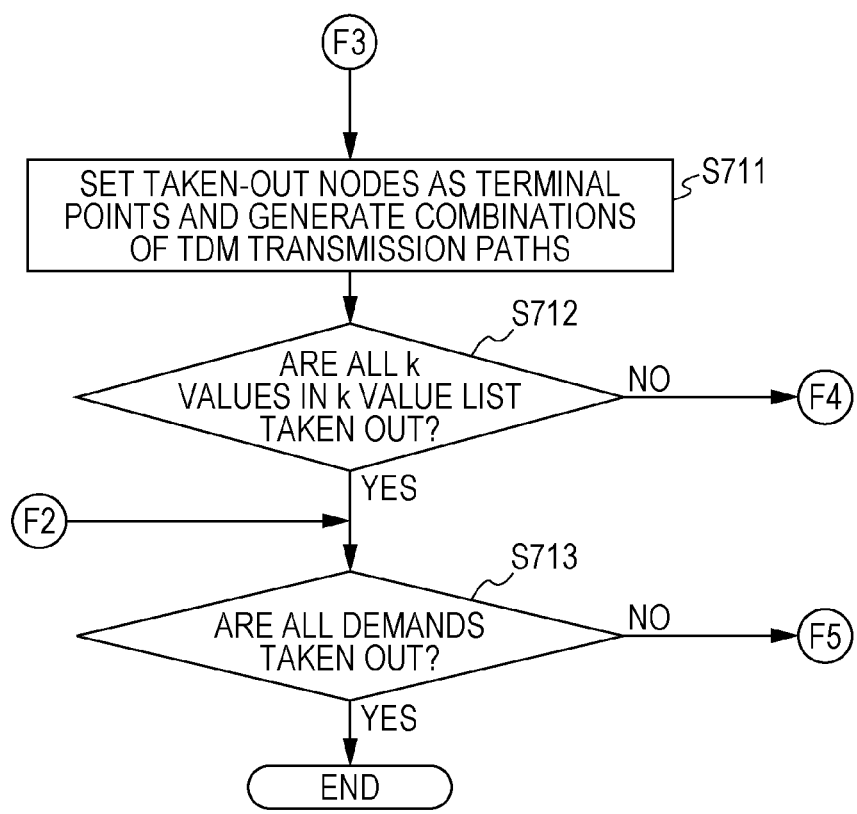
FIG. 46 illustrates an example (3) of the operation flow for generating the combination candidates of the TDM transmission paths according to the tenth modified example.

FIG. 44, FIG. 45, and FIG. 46 illustrate an example of an operation flow for generating combination candidates of the TDM transmission paths according to the tenth modified example. "F1" of FIG. 44 is connected to "F1" of FIG. 45. "F2", "F3", "F4", and "F5" of FIG. 45 are respectively connected to "F2", "F3", "F4", and "F5" of FIG. 46.

In step S701, the node degree score calculation unit 122 extracts the nodes where at least one passing demand exists and also at least one terminating demand exists by referring to the demand information with regard to the nodes included in the node information. The node degree score calculation unit 122 creates a list of the nodes based on the extracted nodes.

In step S702, the node degree score calculation unit 122 counts the number of the terminating demands and the number of the passing demands for each node with respect to the nodes included in the list created in step S701. The node degree score calculation unit 122 extracts the nodes included in the list created in step S701 and the demands included in the demand information from the memory 140. The node degree score calculation unit 122 counts the number of the demands terminating at the node and the number of the demands passing through the node with regard to the respective nodes included in the list created in step S701. The number of the terminating demands may be obtained by calculating a sum of the number of the demands where the node is included in the starting point node or the ending point node of the demands included in FIG. 11 with respect to the respective nodes included in the list created in step S701.

The operation in step S703 to step S705 is similar to the operation in step S202 to step S204 of FIG. 12. The operation in step S706 is also similar to the operation in step S206 of FIG. 12.

In step S707, the mid-flow node list generation unit 126 deletes the node that is not listed in the node order list created in step S705 from the mid-flow node list.

The operation in step S708 and step S709 is similar to the operation in step S207 and step S208 of FIG. 13.

In step S710, the TDM transmission path combination candidate creation unit 128 checks whether or not the value of k taken out in step S709 is higher than the number of the nodes in the mid-flow node list. In a case where the value of k is higher than the number of the nodes in the mid-flow node list (S710; YES), the processing proceeds to S713. In a case where the value of k is lower than or equal to the number of the nodes in the mid-flow node list (S710; NO), the processing proceeds to S711.

The operation in step S711 to step S713 is similar to the operation in step S209 to step S211 of FIG. 13.

According to the network design apparatus 100 based on the tenth modified example, it is possible to select the more appropriate and still fewer combination candidates of the TDM transmission paths by obtaining the degree and the score of the node with regard to the nodes having the passing demand and the terminating demand.

Eleventh Modified Example

Next, an eleventh modified example will be described. The eleventh modified example has a common point with the above-mentioned operation example and the first to tenth modified examples. Therefore, a different point will mainly be described, and the description of the common point will be omitted.

According to the eleventh modified example, a node having a lower value of the score than a certain value is excluded in addition to the configuration of the tenth modified example. The score is a total of the number of the demands terminating at the node and the number of the demands passing through the node. Thus, in a case where the score of the node is low, the traffic amount at the node is low. It may be more advantageous in some cases if the demand passing through the above-mentioned node is accommodated in the TDM transmission path passing through the node instead of transferring from a certain TDM transmission path to the other TDM transmission path. At this time, it may be more advantageous in some cases if only the demand terminating at the node is put in the TDM transmission path having the terminal point at the node. According to the eleventh modified example, the combination candidate of the TDM transmission paths where the terminal point of the TDM transmission path is at the node is not generated in the above-mentioned case.

Figure 47:
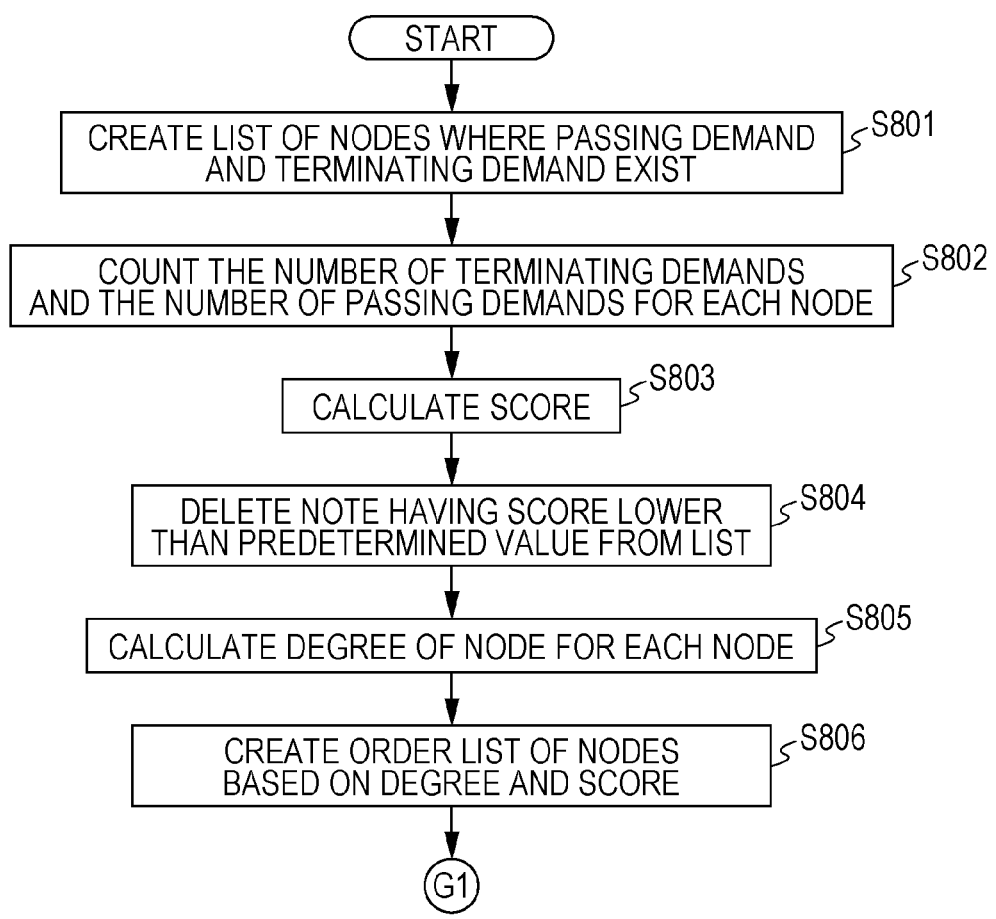
FIG. 47 illustrates an example (1) of an operation flow for generating combination candidates of the TDM transmission paths according to an eleventh modified example.
Figure 48:
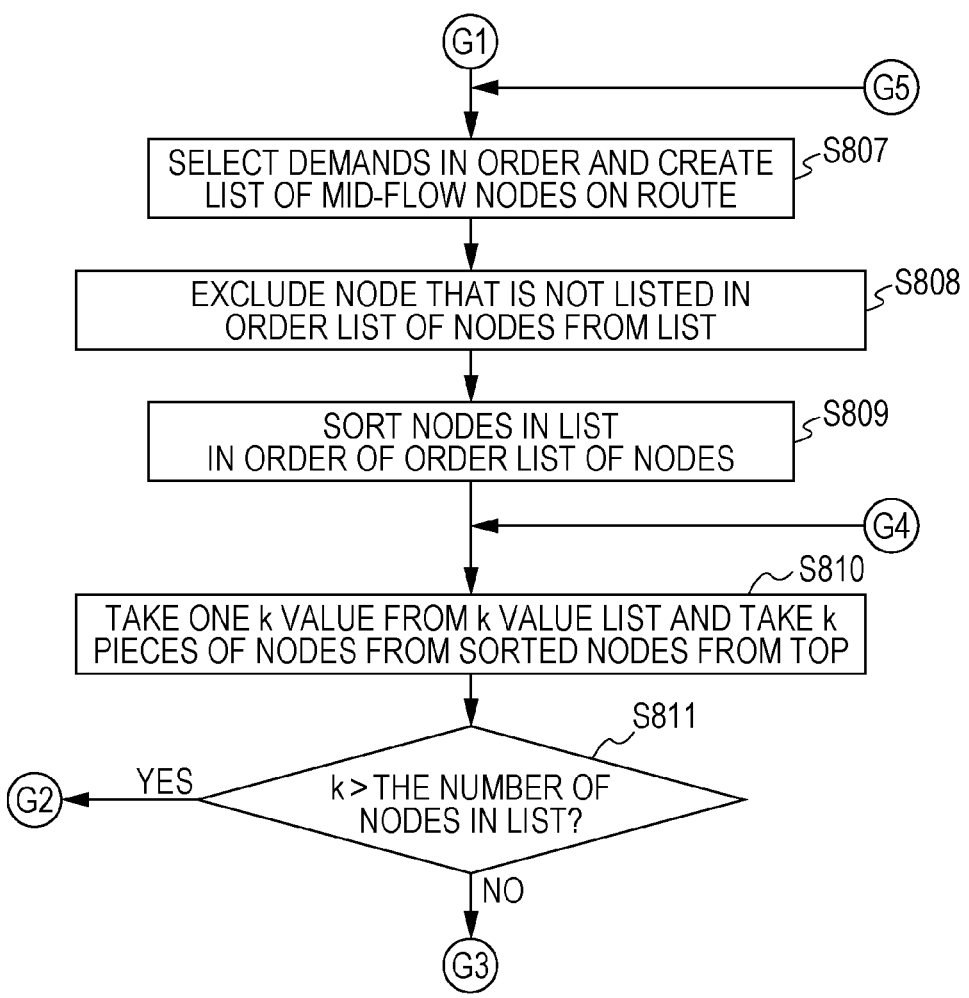
FIG. 48 illustrates an example (2) of the operation flow for generating the combination candidates of the TDM transmission paths according to the eleventh modified example.
Figure 49:
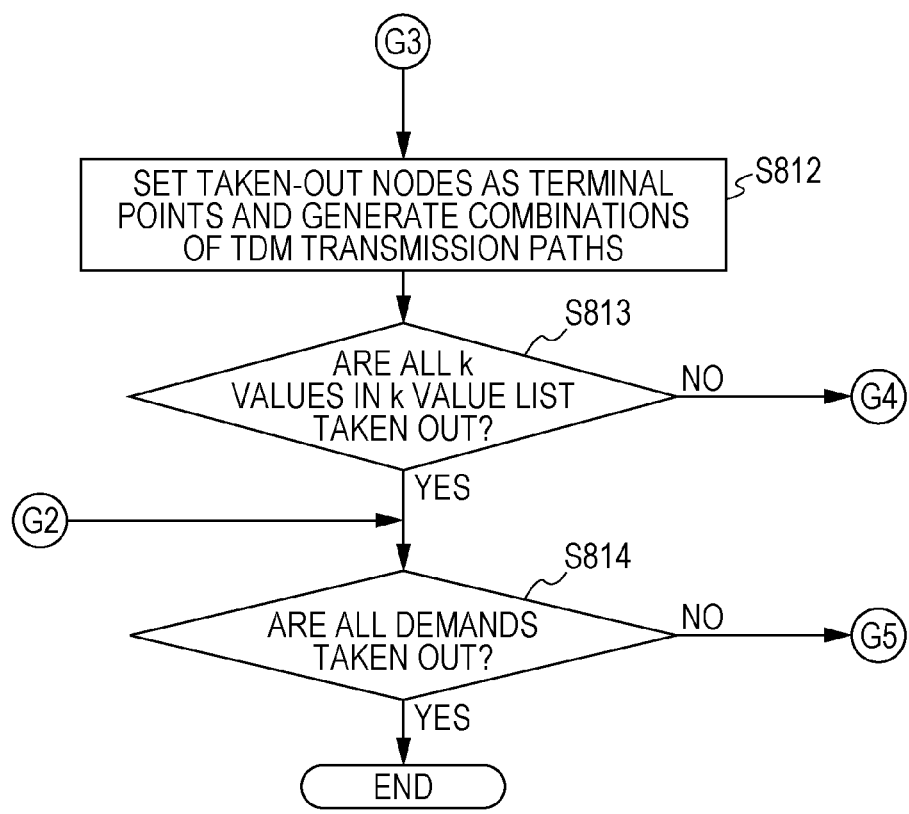
FIG. 49 illustrates an example (3) of the operation flow for generating the combination candidates of the TDM transmission paths according to the eleventh modified example.

FIG. 47, FIG. 48, and FIG. 49 illustrate an example of an operation flow for generating combination candidates of the TDM transmission paths according to the eleventh modified example. "G1" of FIG. 47 is connected to "G1" of FIG. 48. "G2", "G3", "G4", and "G5" of FIG. 48 are respectively connected to "G2", "G3", "G4", and "G5" of FIG. 49.

The operation in step S801 to step S803 is similar to the operation in step S701 to step S703 of FIG. 44.

In step S804, the node degree score calculation unit 122 deletes the node having the score of the node calculated in step S803 lower than a certain value from the list created in step S801. The node degree score calculation unit 122 compares the score of the node with the certain value with regard to the nodes in the list created in step S801 and deletes the node having the score lower than the certain value from the list. The certain value is input in step S101 in FIG. 6.

The operation in step S805 to step S814 is similar to the operation in step S704 of FIG. 44 to step S713 of FIG. 46.

According to the network design apparatus 100 based on the eleventh modified example, it is possible to select the more appropriate and still fewer combination candidates of the TDM transmission paths by obtaining the degree and the score of the node with respect to the node having the score higher than or equal to the certain value among the nodes having the passing demand and the terminating demand.

OPERATION AND EFFECTS OF THE PRESENT EMBODIMENT

The network design apparatus 100 selects the combination candidates of the TDM transmission paths where a probability that the combination may be the optimal solution is high on the basis of the certain condition.

The network design apparatus 100 may narrow down the combination candidates of the TDM transmission paths to the combination candidates that may be the solution to the utmost extent even in a case where the number of combination candidates of the TDM transmission paths that accommodate the demand is high if all the patterns are covered. The network design apparatus 100 may reduce the solution space of the mixed integer programming problem by narrowing down the combination candidates of the TDM transmission paths. As a result, the calculation period of time in the mixed integer programming problem may be shortened, and the mixed integer programming problem may also be calculated at the reduced memory amount.

The above-mentioned respective configurations may be implemented in combination of these to the utmost extent.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A network design apparatus comprising:
a storage unit configured to store network topology information indicating a connection relationship between a plurality of nodes in a network in which the plurality of nodes are connected to each other by a link and demand information indicating a demand including a starting point node, an ending point node, a route, and the number of the demands; and
a processor configured, based on the network topology information and the demand information, to
calculate a total value of the number of the demands terminating at the respective nodes and the number of the demands passing through the respective nodes,
calculate a degree of the node indicating the number of other nodes connected by the link,
create an order list in which the plurality of nodes are arranged in a manner that the node having a higher degree of the node is placed at a higher rank, the node having a higher total value is placed at the higher rank in a case where the nodes have a same degree of the node, and the node having no terminating demand is placed at a lower rank,
sort the nodes passing through between the starting point node and the ending point node except for the starting point node and the ending point node in accordance with the order list in the respective demands,
take out a certain number of nodes from the sorted nodes having the higher rank and generate combination candidates of transmission paths in which the starting point node, the ending point node, and the certain number of nodes are set as terminal points with regard to the respective demands, and
determine a combination of the transmission paths that accommodate the demand from the combination candidates of the transmission paths.

2. The network design apparatus according to claim 1,
wherein at least one of the plurality of nodes is assigned with a non-selectable flag and stored in the storage unit, and
wherein the processor sequentially takes out the nodes from 0 to a certain number from the nodes at the higher ranks of the sorted nodes with regard to the respective demands, generates combination candidates of the transmission paths including the starting point node, the ending point node, and the taken-out node as terminal points for each node, and, in a case where the taken-out node is assigned with the non-selectable flag, ends the generation of the combination candidates with regard to the demand.

3. The network design apparatus according to claim 1,
wherein, in a case where the plurality of nodes having the same degree of the node and the same total value exist, the processor takes out combinations of arbitrary nodes from among the nodes and generates combination candidates of the transmission paths including the nodes including the combinations of the node as terminal points.

4. The network design apparatus according to claim 1,
wherein the processor sets the node having the higher number of the terminating demands as the node at a higher rank in a case where the plurality of nodes having the same degree of the node and the same total value exist.

5. The network design apparatus according to claim 4,
wherein the processor sets the node having the higher number of pairs of the starting point node and the ending point node of the passing demands as the node at the higher rank in a case where the plurality of nodes having the same degree of the node, the same total value, and the same number of the terminating demands exist.

6. The network design apparatus according to claim 4,
wherein the processor sets the node having the higher number of same pairs among pairs of the starting point node and the ending point node of the passing demands as the node at a lower rank in a case where the plurality of nodes having the same degree of the node, the same total value, and the same number of the terminating demands exist.

7. The network design apparatus according to claim 4,
wherein the processor sets the node having a higher average value of the number of same pairs among pairs of the starting point node and the ending point node of the passing demands as the node at a lower rank in a case where the plurality of nodes having the same degree of the node, the same total value, and the same number of the terminating demands exist.

8. The network design apparatus according to claim 4,
wherein the processor sets the node having a higher ratio of the number of the demands having the same starting point node and the same ending point node among the passing demands to the number of the passing demands at a lower rank in a case where the plurality of nodes having the same degree of the node, the same total value, and the same number of the terminating demands exist.

9. A network design method comprising:
based on network topology information indicating a connection relationship between a plurality of nodes in a network in which the plurality of nodes are connected to each other by a link and demand information indicating a demand including a starting point node, an ending point node, a route, and the number of the demands,
calculating a total value of the number of the demands terminating at the respective nodes and the number of the demands passing through the respective nodes;
calculating a degree of the node indicating the number of other nodes connected by the link;
creating an order list in which the plurality of nodes are arranged in a manner that the node having a higher degree of the node is placed at a higher rank, the node having a higher total value is placed at the higher rank in a case where the nodes have a same degree of the node, and the node having no terminating demand is placed at a lower rank;
sorting the nodes passing through between the starting point node and the ending point node except for the starting point node and the ending point node in accordance with the order list in the respective demands;
taking out a certain number of nodes from the sorted nodes from the higher rank and generating combination candidates of transmission paths in which the starting point node, the ending point node, and the certain number of nodes are set as terminal points with regard to the respective demands; and
determining a combination of the transmission paths that accommodate the demand from the combination candidates of the transmission paths.

10. A computer-readable recording medium having stored therein a network design program for causing a computer to execute a process based on network topology information indicating a connection relationship between a plurality of nodes in a network in which the plurality of nodes are connected to each other by a link and demand information indicating a demand including a starting point node, an ending point node, a route, and the number of the demands, the process comprising:
calculating a total value of the number of the demands terminating at the respective nodes and the number of the demands passing through the respective nodes;
calculating a degree of the node indicating the number of other nodes connected by the link;
creating an order list in which the plurality of nodes are arranged in a manner that the node having a higher degree of the node is placed at a higher rank, the node having a higher total value is placed at the higher rank in a case where the nodes have a same degree of the node, and the node having no terminating demand is placed at a lower rank;
sorting the nodes passing through between the starting point node and the ending point node except for the starting point node and the ending point node in accordance with the order list in the respective demands;
taking out a certain number of nodes from the sorted nodes from the higher rank and generating combination candidates of transmission paths in which the starting point node, the ending point node, and the certain number of nodes are set as terminal points with regard to the respective demands; and
determining a combination of the transmission paths that accommodate the demand from the combination candidates of the transmission paths.

\* \* \* \* \*